(12) United States Patent
Watanabe

(10) Patent No.: US 11,917,113 B2
(45) Date of Patent: Feb. 27, 2024

(54) IMAGE PROCESSING DEVICE, READING DEVICE, IMAGE FORMING APPARATUS, AND AMOUNT-OF-CHARACTERISTIC DETECTING METHOD

(71) Applicant: Yuuto Watanabe, Kanagawa (JP)

(72) Inventor: Yuuto Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/865,407

(22) Filed: Jul. 15, 2022

(65) Prior Publication Data
US 2023/0077567 A1 Mar. 16, 2023

(30) Foreign Application Priority Data
Sep. 15, 2021 (JP) .................................. 2021-150301

(51) Int. Cl.
*H04N 1/407* (2006.01)
*H04N 1/00* (2006.01)
*H04N 1/387* (2006.01)

(52) U.S. Cl.
CPC ..... *H04N 1/00718* (2013.01); *H04N 1/00737* (2013.01); *H04N 1/3878* (2013.01)

(58) Field of Classification Search
None
See application file for complete search history.

(56) References Cited

U.S. PATENT DOCUMENTS

| 5,715,071 | A | * | 2/1998 | Takashimizu | B65H 3/0669 |
| | | | | | 358/492 |
| 2004/0215965 | A1 | * | 10/2004 | Tokuda | G06T 1/0028 |
| | | | | | 713/176 |
| 2017/0187916 | A1 | | 6/2017 | Ohta et al. | |
| 2017/0187917 | A1 | | 6/2017 | Tanaka et al. | |
| 2017/0195518 | A1 | | 7/2017 | Watanabe et al. | |
| 2019/0012290 | A1 | | 1/2019 | Watanabe | |
| 2019/0318188 | A1 | * | 10/2019 | Miller | G06V 10/243 |
| 2019/0387124 | A1 | | 12/2019 | Watanabe | |

(Continued)

FOREIGN PATENT DOCUMENTS

| JP | 2010-154305 | 7/2010 |
| JP | 2014-053739 | 3/2014 |

(Continued)

*Primary Examiner* — Dung D Tran
(74) *Attorney, Agent, or Firm* — XSENSUS LLP

(57) ABSTRACT

An image processing device and an amount-of-characteristic detecting method. The image processing apparatus includes a first image processing device to process an invisible image of an object, a second image processing device to process a visible image of the object, and a controller to control the first image processing device and the second image processing device. The first image processing device includes a first skew detector to detect a skew of the object from the invisible image of the object. The second image processing device includes a second skew detector to detect the skew from the visible image of the object, and circuitry to adjust the skew of the object based on a first result of skew detection performed by the first skew detector of the first image processing device or a second result of skew detection performed by the second skew detector of the second image processing device.

20 Claims, 29 Drawing Sheets

(56) References Cited

U.S. PATENT DOCUMENTS

| | | | |
|---|---|---|---|
| 2020/0106919 A1* | 4/2020 | Nakamura | H04N 1/00718 |
| 2021/0034308 A1 | 2/2021 | Watanabe | |
| 2021/0112171 A1* | 4/2021 | Tachibana | B65H 3/0684 |
| 2021/0152848 A1* | 5/2021 | Mizuno | H04N 19/115 |
| 2021/0281712 A1* | 9/2021 | Nakamura | H04N 1/00748 |

FOREIGN PATENT DOCUMENTS

| | | |
|---|---|---|
| JP | 2014-176975 | 9/2014 |
| JP | 2020-053931 | 4/2020 |

* cited by examiner

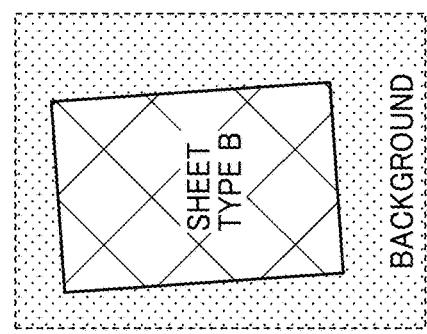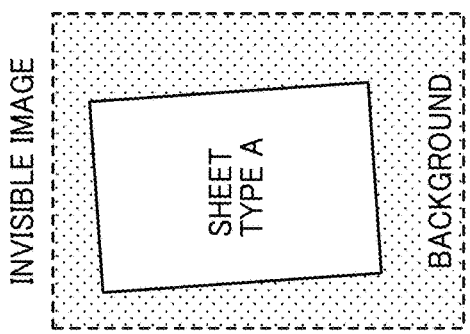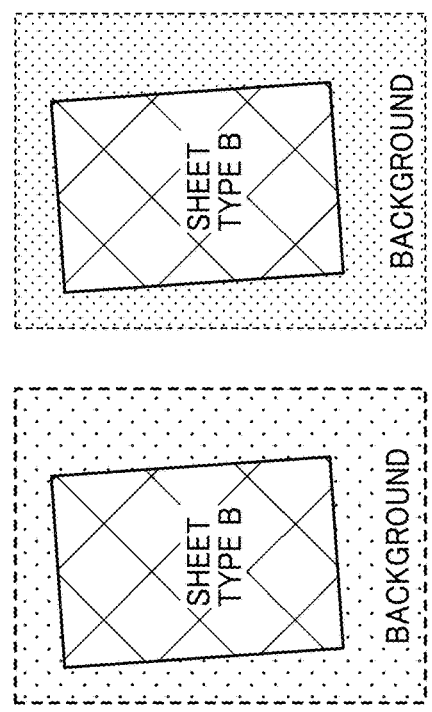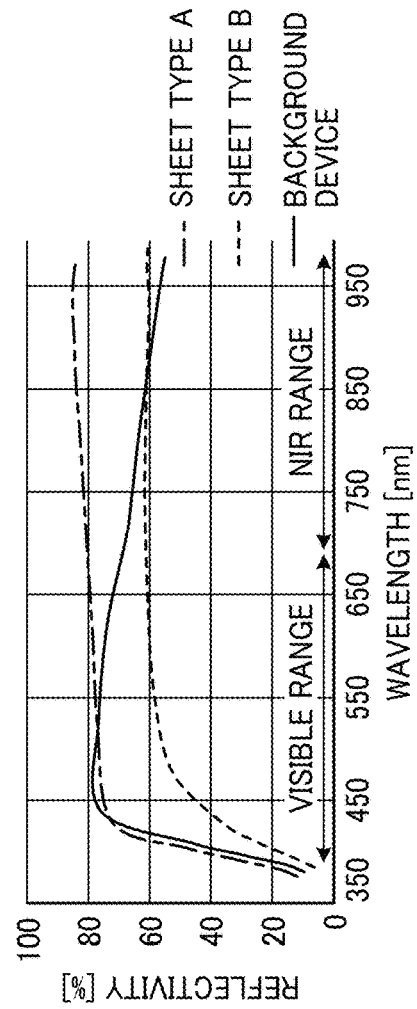

PORTION OF
BACKGROUND DEVICE

GRID PATTERN

DISCRETE PATTERN

VISIBLE IMAGE

INVISIBLE IMAGE

VISIBLE IMAGE

INVISIBLE IMAGE

IMAGE OF OR OF EDGE

VISIBLE IMAGE

INVISIBLE IMAGE

PRE-CORRECTION
VISIBLE IMAGE

PRE-CORRECTION
INVISIBLE IMAGE

CORRECTED
VISIBLE IMAGE

CORRECTED
INVISIBLE IMAGE

IMAGE WHOSE INCLINATION
HAS NOT-YET BEEN CORRECTED

IMAGE WHOSE INCLINATION
HAS BEEN CORRECTED

IMAGE PROCESSING DEVICE, READING DEVICE, IMAGE FORMING APPARATUS, AND AMOUNT-OF-CHARACTERISTIC DETECTING METHOD

CROSS-REFERENCE TO RELATED APPLICATION

This patent application is based on and claims priority pursuant to 35 U.S.C. § 119(a) to Japanese Patent Application No. 2021-150301, filed on Sep. 15, 2021, in the Japan Patent Office, the entire disclosure of which is hereby incorporated by reference herein.

BACKGROUND

Technical Field

Embodiments of the present disclosure relate to an image processing device, a reading device, an image forming apparatus, and an amount-of-characteristic detecting method.

Background Art

Image correction technologies are known in the related art. In such known image correction technologies, an edge of a document is detected from a scanned image and the inclination and position of the document are corrected based on the detected edge.

Technologies have been developed for correcting the skew or inclination on the image of a document scanned by a scanner. Moreover, technologies are known in the art in which the image of a document is scanned and obtained using red, green, and blue (RGB) visible light and the skew is corrected based on the shade or shadow cast on the boundary between the document plane and the background plate. Further, methods in which a plurality of light sources with different wavelengths including ultraviolet (UV) regions are known in the art.

SUMMARY

Embodiments of the present disclosure described herein provide an image processing device and an amount-of-characteristic detecting method. The image processing apparatus includes a first image processing device to process an invisible image of an object, a second image processing device to process a visible image of the object, and a controller to control the first image processing device and the second image processing device. The first image processing device includes a first skew detector to detect a skew of the object from the invisible image of the object. The second image processing device includes a second skew detector to detect the skew from the visible image of the object, and circuitry to adjust the skew of the object based on a first result of skew detection performed by the first skew detector of the first image processing device or a second result of skew detection performed by the second skew detector of the second image processing device. The amount-of-characteristic detecting includes setting a parameter used to detect a skew, providing a notification of a result of detection when skew is detected, obtaining a result of detection of the skew, and controlling reading from a memory to adjust the skew based on the result of detection of the skew.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 16A, FIG. 16B, FIG. 16C, FIG. 16D, and FIG. 16E are diagrams each illustrating the differences in spectral reflective property between a visible image and an invisible image depending on the type of sheet, according to an embodiment of the present disclosure.

Figure 1:
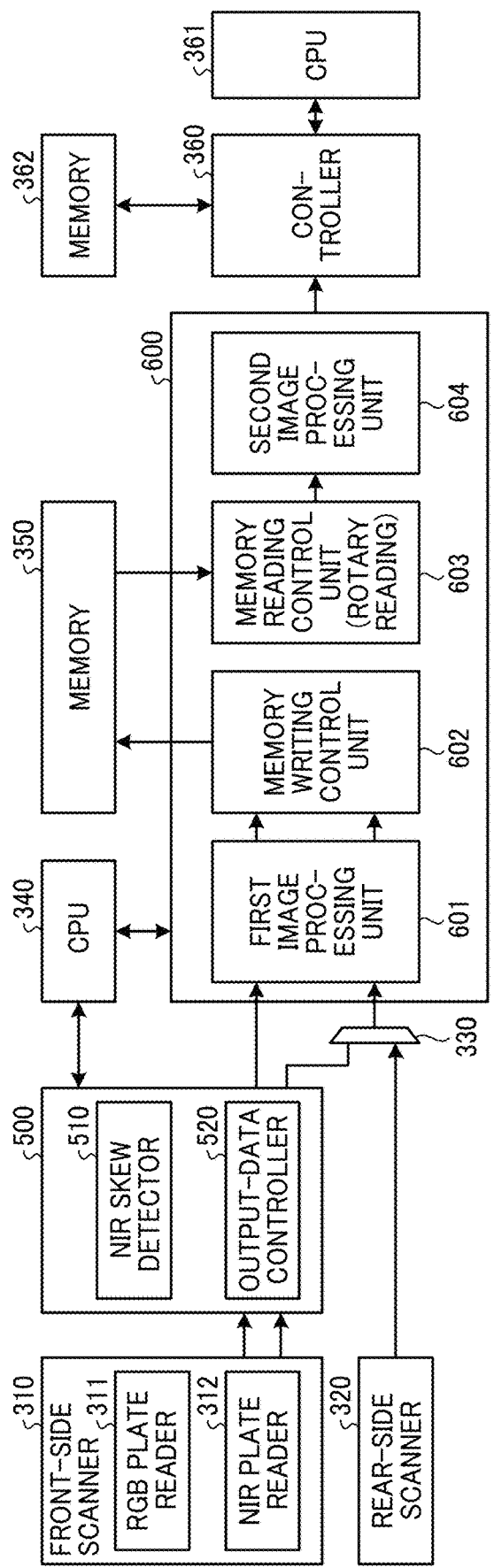
FIG. 1 is a diagram illustrating a configuration and the hardware blocks of a reading device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image processing device, a reading device, an image forming apparatus, and an amount-of-characteristic detecting method according to an embodiment of the present disclosure are described below in detail with reference to the accompanying drawings.

First Embodiment

FIG. 1 is a diagram illustrating a configuration and the hardware blocks of a reading device according to the present embodiment.

In the hardware blocks of FIG. 1, a front-side scanner 310, a rear-side scanner 320, a first image processing device 500, a second image processing device 600, a selector 330, a central processing unit (CPU) 340, a memory 350, a controller 360, a central processing unit 361, and a memory 362 are illustrated as major elements of a reading device. Among those elements, the front-side scanner 310 and the rear-side scanner 320 together serve as a scanner. The first image processing device 500, the second image processing device 600, the selector 330, the CPU 340, and the memory 350 according to the present embodiment together configure an image processor. The CPU 340, the memory 350, the controller 360, the CPU 361, and the memory 362 are typical hardware provided for a reading device, and these elements may be used by the reading device. The CPU 340 has access to both the first image processing device 500 and second image processing device 600, and can control both the first image processing device 500 and second image processing device 600. The memory 350 is a memory used for image processing by the second image processing device 600. The controller 360, the CPU 361, and the memory 362 together serve as a main controller provided for the reading device.

The front-side scanner 310 according to the present embodiment is an image scanner that reads a visible image and an invisible image from the front surface of a document. In the present embodiment, the document serves as an object. The front-side scanner 310 includes an imaging sensor that captures an image of the light that is emitted from a light source and is reflected by the document surface. The imaging sensor includes, for example, a red, green, and blue plate reader 311 that reads images in red, green, and blue (RGB) and a near-infrared (NIR) plate reader 312 that reads images of near-infrared radiation. The RGB plate reader 311 reads a visible image from the surface of a document. The NIR plate reader 312 reads a near-infrared (NIR) image, which is an invisible image, from the surface of a document. The RGB region and the NIR region of the reader of the imaging sensor according to the present embodiment serve as the visible-light reader and the invisible-light reader, respectively. However, no limitation is intended thereby, and the visible and invisible wavelength ranges are not limited to the RGB ranges or the NIR ranges. For example, at least one of the RGB wavelength ranges may be used as the visible wavelength range. For example, the wavelength range of ultraviolet (UV) light may be used as the invisible wavelength range as long as such a wavelength range is out of the visible range. In the following description, by way of example, the RGB and NIR wavelength ranges are used as visible and invisible wavelength ranges.

The front-side scanner 310 irradiates the front surface of the document with light to read an image. In the present embodiment, the light to be emitted is visible light of the RGB wavelength ranges and invisible light of the NIR wavelength ranges. The front-side scanner 310 according to the present embodiment scans and reads the refection light of the light emitted to the document surface. As a result, the front-side scanner 310 outputs the read data of each one of the three plates of RGB including the red (R) plate, the green (G) plate, and the blue (B) plate from the RGB plate reader 311, and outputs the read data of one plate of a near-infrared (NIR) plate from the NIR plate reader 312. In the rear-side scanner 320 according to the present embodiment, the imaging sensor is provided with an RGB reader. The rear-side scanner 320 scans and reads the rear side of the document, and outputs the read data of each one of the three plates of RGB including the R plate, the G plate, and the B plate.

The multiple image processing devices of the reading device according to the present embodiment include the first image processing device 500 and the second image processing device 600 that can communicate with the CPU 340, and the first image processing device 500 detects the skew using the read data of the NIR plate. In the present embodiment, the skew is the information indicating the angle of inclination of the document.

The first image processing device 500 has an interface used to receive the read data of four plates (RGB+NR) from the front-side scanner 310, and includes a NIR skew detector 510 and an output-data controller 520. The NIR skew detector 510 according to the present embodiment detects a skew on the document using the read data of the NIR plate from the NIR plate reader 312 out of the read data of four plates (RGB+NIR). The output-data controller 520 according to the present embodiment receives the read data of four plates (RGB+NIR) from the front-side scanner 310, and performs output-path control to output the data of the image plates suited for the image-data paths of the image plates of the second image processing device 600 that is commercially available.

The selector 330 according to the present embodiment is an output device that selects either one of the data output from the rear-side scanner 320 and the data output from the first image processing device 500 and selectively outputs the selected one of the above outputs to the second image processing device 60M. For example, when skew detection by the first image processing device 500 is to be performed, the selector 330 selects the output from the first image processing device 500. By contrast, when skew detection by the first image processing device 500 is not to be performed, the selector 330 selects the output from the rear-side scanner 320.

The first image processing device 500 according to the present embodiment may be configured such that the skew detecting function of the NIR skew detector 510 can be turned on or turned off depending on the setting of, for example, parameters. Alternatively, the first image processing device 500 can be attached to and detached from the reading device. In the latter case, when the first image processing device 500 is detached and the read data of four plates (RGB+NIR) is output from the front-side scanner 310, the three plates of red, green, and blue (RGB) are transferred to the second image processing device 600, and the read data of three plates of RGB of the rear-side scanner 320, which is selected by the selector 330, is transferred to the second image processing device 600.

Accordingly, a configuration in which skew detection and skew adjustment are performed based on the read data of three plates of red, green, and blue (RGB) may be applied to the second image processing device 600 can employ a conventional configuration for detecting and correcting a skew from the read data of three RGB colors. When the first image processing device 500 performs the skew detection, the second image processing device 600 performs the skew adjustment on the read data of three plates of red, green, and blue (RGB) based on the results of the skew detection performed by the first image processing device 500. When the first image processing device 500 does not perform the skew detection, the second image processing device 600 detects a skew from the read data of the plates of RGB based on, for example, the shade of the document, and performs the skew adjustment on the detected skew. The skew adjustment for the image of the document corresponds to the correction for the image of an object.

Once some skew is detected by the NIR skew detector 510, the first image processing device 500 according to the present embodiment generates an interrupt to provide notification of the detection results to the CPU 340. Once received the notification of the detection results, the CPU 340 obtains the skew detected by the NIR skew detector 510 of the first image processing device 500.

In the present embodiment, the first image processing device 500 is provided with a skew detection function using the invisible image of the NIR plate in order to perform a highly accurate skew adjustment. By contrast, the second image processing device 600 is configured to correct the skew based on the results of the skew detection performed by the first image processing device 500. With this configuration, even when the configuration is changed to a configuration in which the skew detection is performed using the NIR plate, a common configuration of the image processing device in which skew detection and skew adjustment are performed based on the data of the visible image of the plates of RGB can be applied to the second image processing device 600. Accordingly, the change or modification to high-precision skew adjustment using a NIR plate can be implemented at a low cost.

Figure 2:
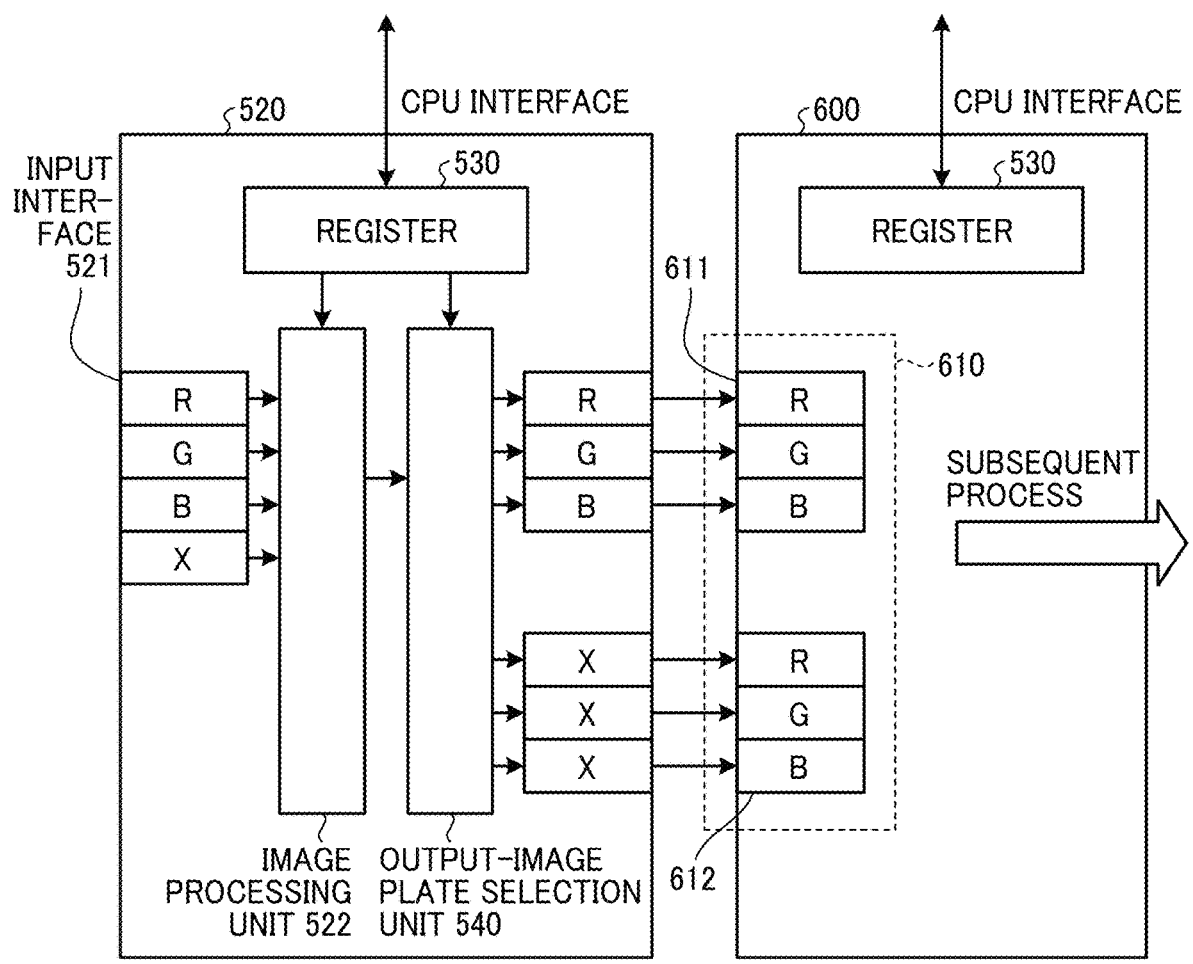
FIG. 2 is a diagram illustrating a configuration of an output-data controller of a first image processing device, according to an embodiment of the present disclosure.

FIG. 2 is a diagram illustrating a configuration of the output-data controller 520 of the first image processing device 500, according to the present embodiment.

FIG. 2 also illustrates a portion of a configuration or structure of the second image processing device 600 such that the relation between the first image processing device 500 and the interface of the second image processing device 600 will be well understood.

As illustrated in FIG. 2, the second image processing device 600 is typically provided with an interface circuit 610 that transfers the read data of a pair of three plates of red, green, and blue (RGB) on the front and rear sides of a document. In the interface circuit 610, the front-side transfer path 611 serves as an image-data path that transfers the read data of the RGB plates on the front side of the document, and the rear-side transfer path 612 serves as an image-data path that transfers the read data of the RGB plates on the rear side of the document.

The output-data controller 520 according to the present embodiment outputs the read data of one NIR plate and the read data of three plates of red, green, and blue (RGB) on the front and rear sides of a document to the interface circuit 610, and transfers the read data to the subsequent stage through a plurality of paths. In the present embodiment, the output-data controller 520 receives the read data of the four plates including the three plates of RGB and the NIR plate from the input interface 521, and outputs the read data of the four plates in a distributed manner to the front-side transfer path 611 and the rear-side transfer path 612 of the interface circuit 610 of the second image processing device 600. The read data that is received by the front-side transfer path 611 and the rear-side transfer path 612 of the interface circuit 610 of the second image processing device 600 are to be transferred in the subsequent processes. Note that the NIR plate is indicated by "X" in FIG. 2.

More specifically, the output-data controller 520 according to the present embodiment includes an input interface 521, an image processing unit 522, a register 530, an output-image plate selection unit 540, and an output interface 550. The output-data controller 520 receives the read data of four plates of the RGB plates and one of the X plates through the input interface 521. The register 530 according to the present embodiment is a setting register in which the CPU 340 sets parameters. The output-image plate selection unit 540 selects a pattern of the image plates to be output to the front-side transfer path 611 and the rear-side transfer path 612 of the interface circuit 610 based on the parameters set in the register 530, and selects the destination device of each one of the multiple image plates. Predetermined image processing is performed by the image processing unit 522 on the multiple items of data of the four plates including the plates of RGB and the X plate, and the processed multiple items of data are output to the front-side transfer path 611 and the rear-side transfer path 612 of the second image processing device 600 in accordance with the selection of path made by the output-image plate selection unit 540.

In the present embodiment described with reference to FIG. 2, the read data of three plates of RGB on the front side of a document is output to the front-side transfer path 611, and the read data of an X plate on the rear side of the document is output to the rear-side transfer path 612. However, no limitation is indicated thereby. Depending on the setting of the register 530, the read data of the X plate can be transferred to any desired one of the RGB paths of the rear-side transfer path 612. Although the read data of the X plate is transferred to all the RGB paths of the rear-side transfer path 612 in the present embodiment, for example, the read data of three plates including the R plate, the X plate, and the B plate may be transferred to the RGB paths of the rear-side transfer path 612 in an alternative embodiment. The plate or multiple plates to be output may be switched as a central processing unit (CPU) controls software to change the setting of the register 530. Due to such a configuration, the setting can be changed at any desired time.

The output-data controller 520 also transfers the read data of one NIR plate to the NIR skew detector 510. The NIR skew detector 510 detects a skew using the transferred read data of one NIR plate. The transfer of the read data of one NIR plate to the NIR skew detector 510 by the output-data controller 520 may be implemented by changing the setting on the register 530. For example, when the skew detecting function is turned on in the register 530, the output-data controller 520 transfers the read data of one plate of the NIR plate to the NIR skew detector 510. When the skew detecting function is turned off in the register 530, the output-data controller 520 does not transfer the read data of one plate of the NIR plate to the NIR skew detector 510. In other words, skew detection using the NIR plate is not performed.

Figure 3:
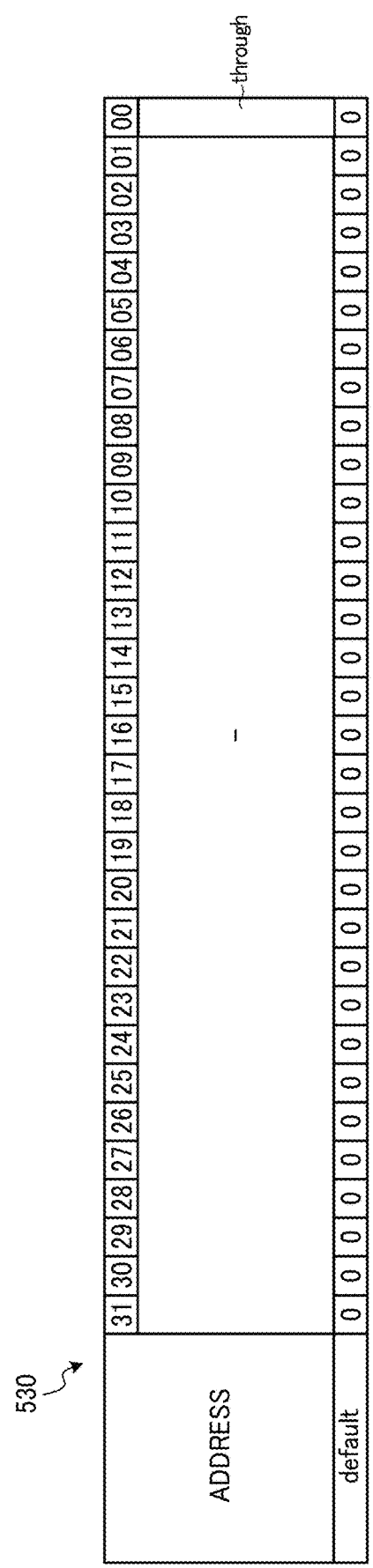
FIG. 3 is a diagram illustrating a first method of setting parameters in a register, according to an embodiment of the present disclosure.

FIG. 3 is a diagram illustrating a first method of setting parameters in the register 530, according to the present embodiment.

A method of setting parameters in the register 530 is described below. Firstly, a first method of setting parameters to turn on or turn of the skew detection of the first image processing device 500 is described below with reference to FIG. 3. Secondly, a second method of setting parameters in which the output-image plate selection unit 540 selects a pattern of image plates to be output to the front-side transfer path 611 and the rear-side transfer path 612 of the interface circuit 610 is described below with reference to FIG. 4.

FIG. 3 is a diagram illustrating the first method of setting parameters in the register 530, according to the present embodiment. By the setting of the register 530, even when the first image processing device 500 is mounted, operations such as image processing for skew detection in the first image processing device 500 can be skipped. In the present embodiment described with reference to FIG. 3, as long as the default value "through" is zero, the first image processing device 500 performs operations such as image processing for skew detection. By contrast, when the default value "through" is set to "1," the first image processing device 500 skips operations such as image processing for skew detection, and selects one of the paths. Then, the read data of each plate is transferred to the second image processing device 600. Moreover, for example, a threshold to be used by the first image processing device 500 based on which a skew is detected is set as a parameter for skew detection.

Figure 4:
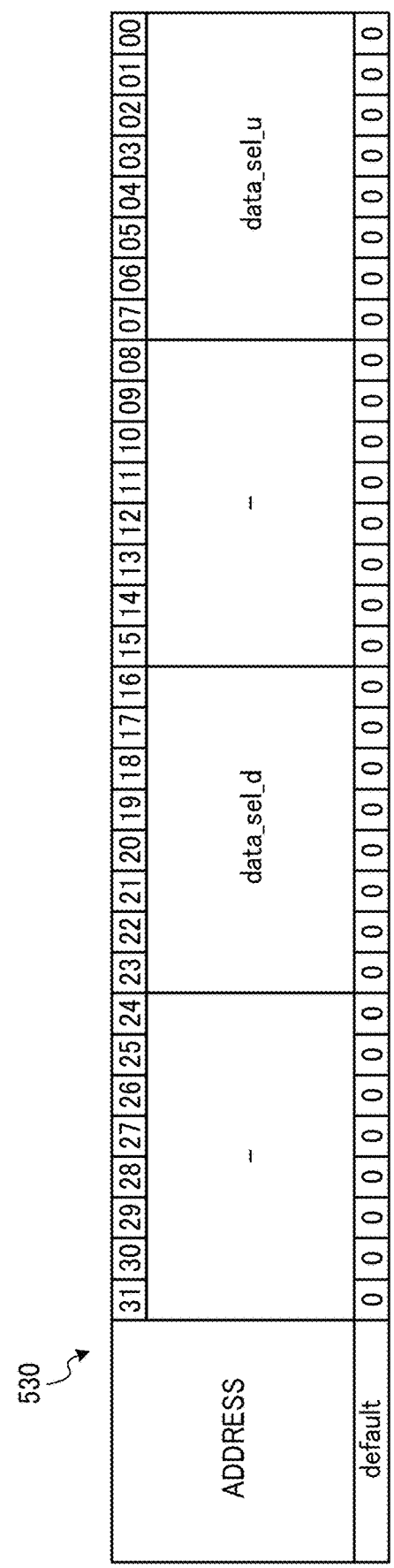
FIG. 4 is a diagram illustrating a second method of setting parameters in a register, according to an embodiment of the present disclosure.

FIG. 4 is a diagram illustrating a second method of setting parameters in the register 530, according to the present embodiment.

More specifically, a method of setting the register 530 to select the image plates to be output is described below. "data_sel_u" in FIG. 4 indicates the settings for the front side, and "data_sel_d" in FIG. 4 indicates the settings for the rear side. For example, when "data_sel_u" and "data_sel_d" in FIG. 4 indicates "0x00" and "0x01", respectively (data_sel_u=0x00/data_sel_d=0x01), the read data of the plates of RGB is output to the front-side transfer path 611, and the read data of the X plate is output to the rear-side transfer path 612.

Figure 5:
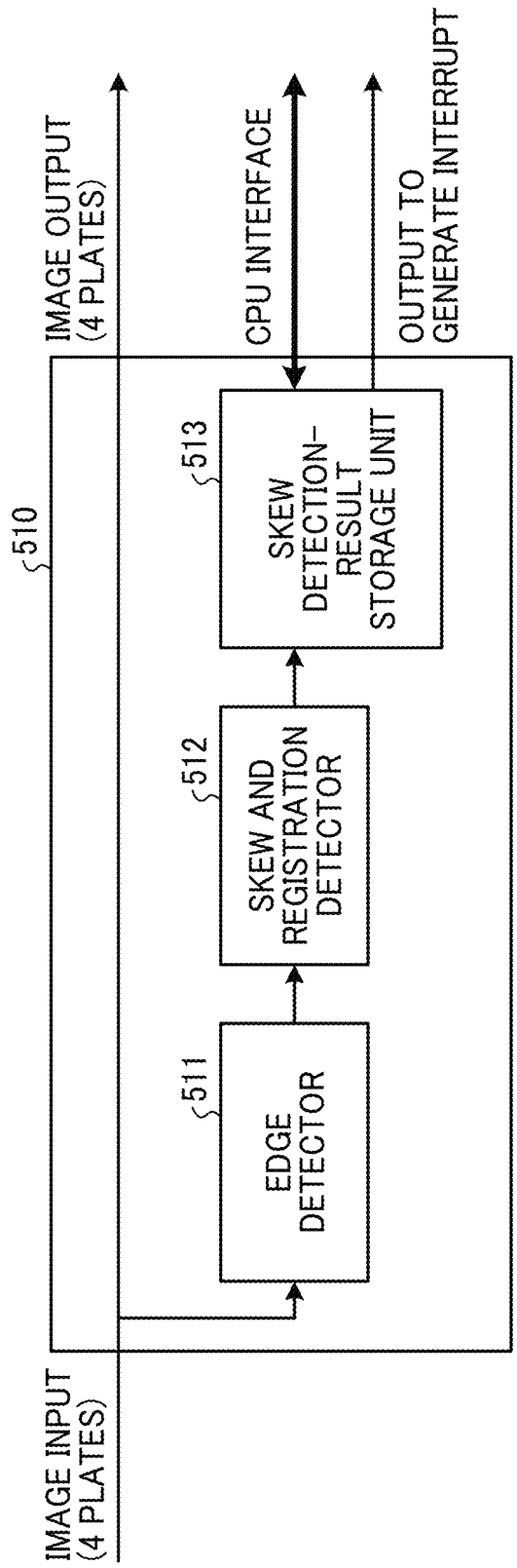
FIG. 5 is a diagram illustrating the hardware blocks of a near-infrared skew detector according to an embodiment of the present disclosure.

FIG. 5 is a diagram illustrating the hardware blocks of the NIR skew detector 510 according to the present embodiment.

In the present embodiment described with reference to FIG. 5, the NIR skew detector 510 according to the present embodiment includes an edge detector 511, a skew and registration detector 512, and a skew detection-result storage unit 513.

The edge detector 511 detects the boundary between a document plane and a background plate based on the image of the NIR plate out of the input images of the four plates, and the skew and registration detector 512 identifies the edges of the document. By so doing, skew on the document can be detected. Once the results of the detection are stored in the skew detection-result storage unit 513, an interrupt signal is generated to provide notification that the skew has been detected, and the generated interrupt signal is sent to the CPU. Once an interrupt signal is generated to provide notification, the CPU accesses the skew detection-result storage unit 513 and obtains the detection result.

In the present embodiment described with reference to FIG. 1, the second image processing device 600 includes a first image processing unit 601, a memory writing control unit 602, a memory reading control unit 603, and a second image processing unit 604. The memory writing control unit 602 and the memory reading control unit 603 according to the present embodiment correspond to the NIR skew detector 510 and the image correction unit 203 of the second image processing device 600.

The first image processing unit 601 according to the present embodiment performs image processing on each item of the image data of the front and rear sides of the document read by the scanner. For example, when the first image processing device 500 does not perform the skew detection, the first image processing unit 601 detects a skew on the document from the read data of three plates of red, green, and blue (RGB) based on the shade of the document.

The data that has gone through the image processing is stored in the memory 350 through the memory writing control unit 602. Then, the memory reading control unit 603 uses a rotary reading function to read the image data from a desired address of the memory 350 when the stored data is to be readout. As the readout address of the memory 350 is controlled by the CPU 340, the memory reading control unit 603 performs the skew adjustment on the image data. When the first image processing device 500 performs the skew detection, the CPU 340 controls the readout address from the memory 350 based on the results of the skew detection. Due to such a configuration, the memory reading control unit 603 performs the skew adjustment on the image data.

The corrected image data is processed by the second image processing unit 604, and then stored in the memory 362 under the control of the CPU 340.

Figure 6:
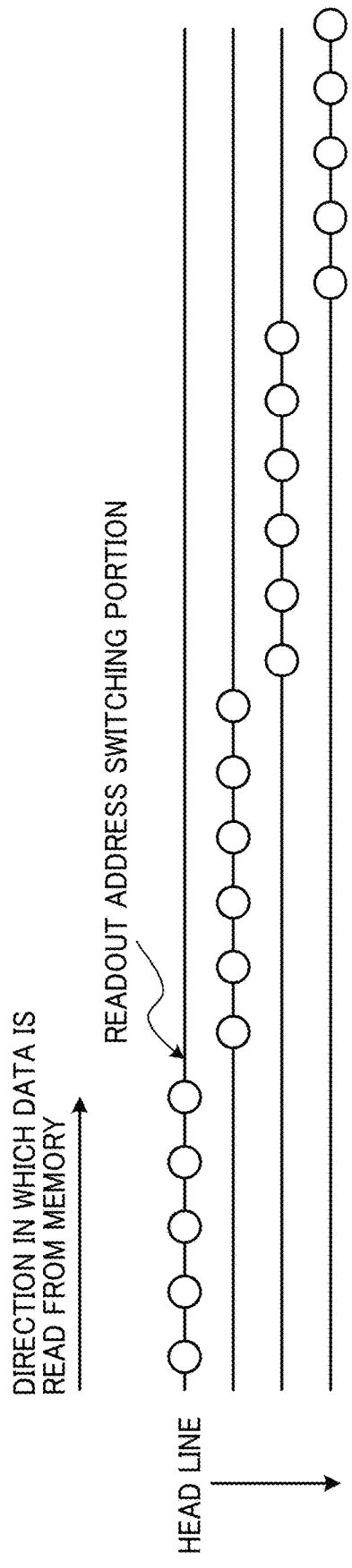
FIG. 6 is a diagram illustrating how the memory reading control unit reads image data from a memory while correcting the skew of the image data, according to an embodiment of the present disclosure.

FIG. 6 is a diagram illustrating how the memory reading control unit 603 reads the image data from the memory 350 while correcting the skew of the image data, according to the present embodiment.

In the present embodiment, control is performed based on the skew figured out by the image processing device in the preceding stage upon setting a plurality of points to switch the readout address.

Figure 7:
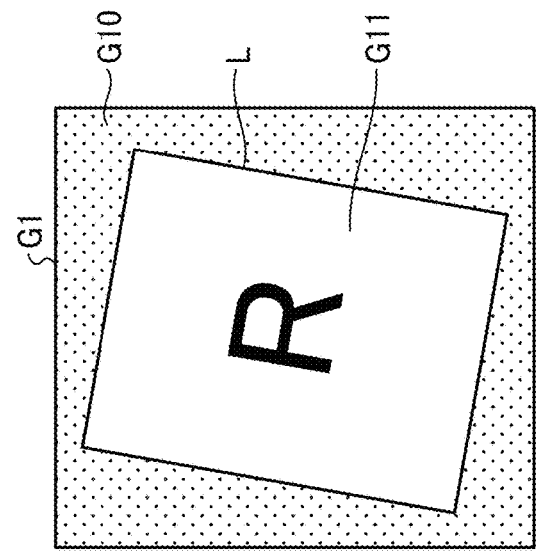
FIG. 7 is a diagram illustrating a method of detecting a skew, according to an embodiment of the present disclosure.

FIG. 7 is a diagram illustrating a method of detecting a skew, according to the present embodiment.

The light with the NIR wavelength ranges, which is invisible light, only reacts to specific wavelength ranges. In order to utilize this characteristic, a member that absorbs NIR light, which is invisible light, is used as the background plate. Then, capturing is performed upon receiving the reflected light. Accordingly, when the first image processing device 500 performs the skew detection, as illustrated in FIG. 7, the boundary L between the background plate G1 and the document G10 can be stably and accurately obtained from the NIR image G11. If the first image processing device 500 does not perform the skew detection, the second image processing device 600 may adopt a skew detection method known in the an. In the present embodiment, the shade formed between the document and the background plate is detected based on the images of each one of the three plates of RGB to detect the skew.

Figure 8:
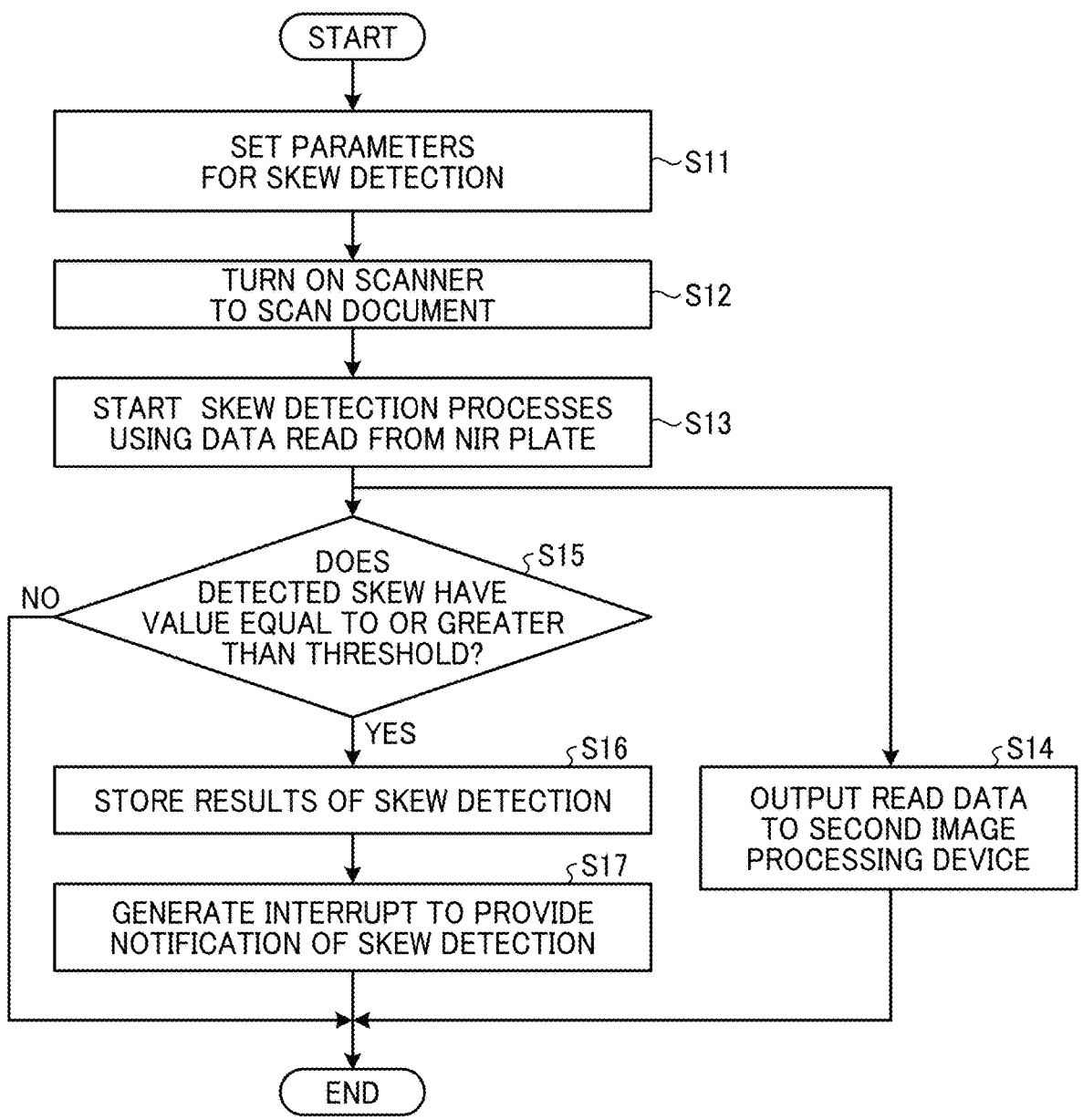
FIG. 8 is a diagram illustrating the operation flow of a scanner according to an embodiment of the present disclosure.

FIG. 8 is a diagram illustrating the operation flow of a scanner according to the present embodiment.

Firstly, in a step S11, the reading device sets parameters for skew detection to the first image processing device 500 before the reading operation by the scanner. More specifically, the settings to be used when the skew detection is turned on in the first image processing device 500 are edited, or for example, a threshold used to determine whether the skew detection is to be performed is set.

Subsequently, in a step S12, the reading device turns on the scanner to scan the document.

Subsequently, as the skew detection is turned on, in a step S13, the reading device uses the first image processing device 500 to start the skew detection processes based on the data read from the NIR plate.

In a step S14, the reading device outputs the data read from the document from the first image processing device 500 to the second image processing device 600 in parallel with the skew detection processes. The order in which the skew detection processes and the output of the read data to the second image processing device 600 are performed may be switched.

Once the process in the step S13 is started and skew is detected on the document, in a step S15, the reading device determines whether the detected skew has a value equal to or greater than the threshold set in the step S11. When it is determined that the detected skew has a value less than the threshold set in the step S11 ("NO" in the step S15), the skew adjusting processes are to be terminated. In other words, when the angle of inclination of the document is small, the skew adjusting processes are to be terminated.

By contrast, when the degree of the detected skew is equal to or greater than the threshold set in the step S11 ("YES" in the step S15), in a step S16, the reading device stores the results of skew detection. In other words, when the angle of inclination of the document is wide, in the step S16, the reading device stores the results of skew detection. Then, in a step S17, the reading device generates an interrupt to provide notification of skew detection to the subsequent stage.

As described above, the first image processing device 500 according to the present embodiment outputs the image data on which the image processing is performed as desired to the second image processing device 600 in the subsequent stage, in parallel with the skew detection processes. Due to such a configuration, the process can smoothly be shifted to the skew adjustment processes in the second image processing device 600.

The processes of the second image processing device 600 in the subsequent stage are described below.

Figure 9:
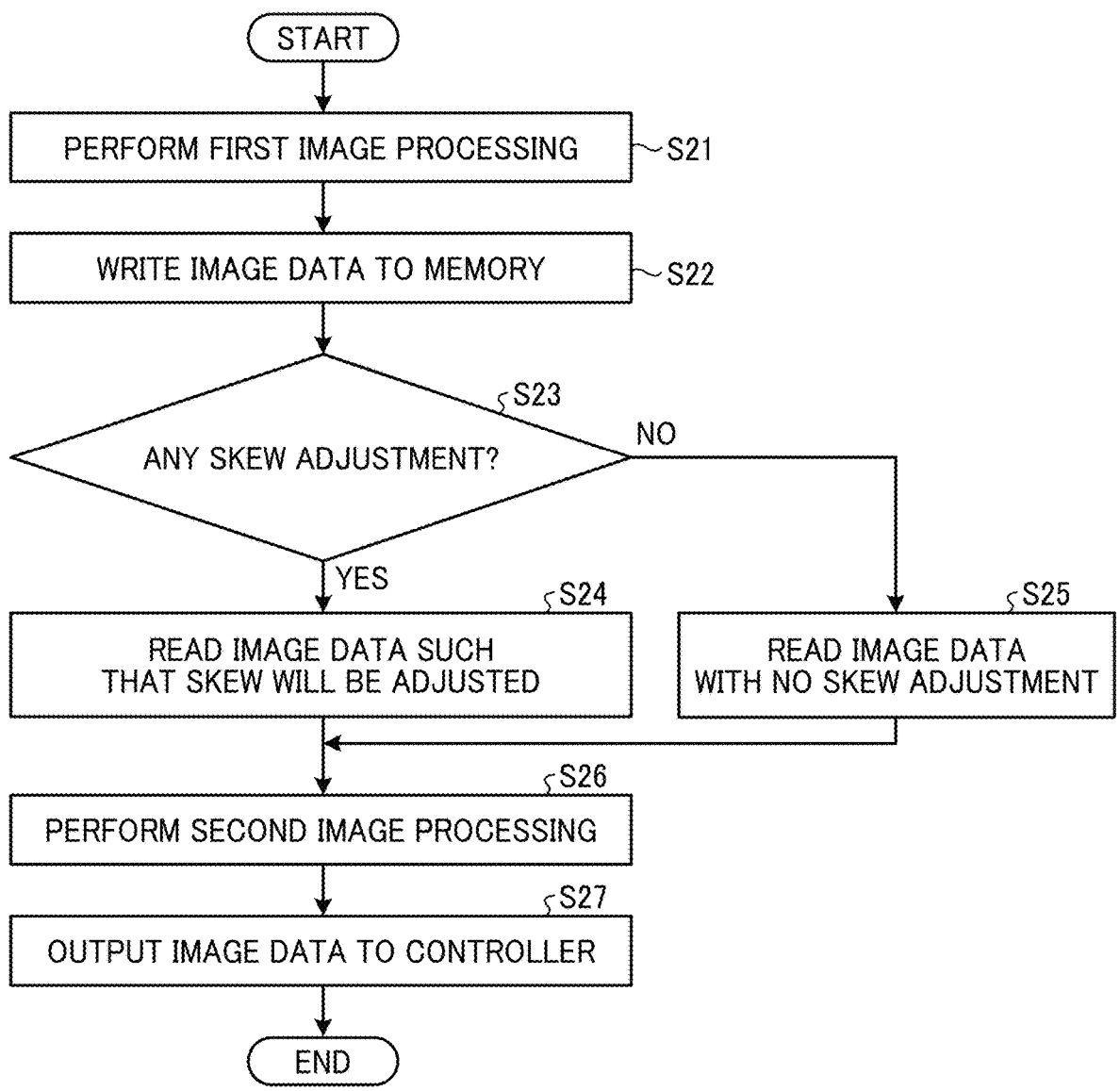
FIG. 9 is a diagram illustrating the operation flow of a second image processing device, according to an embodiment of the present disclosure.

FIG. 9 is a diagram illustrating an operation flow of the second image processing device 600, according to the present embodiment.

More specifically, the operation flow of the second image processing device 600 that has received the image data read from the first image processing device 500 is illustrated in FIG. 9.

Firstly, in a step S21, the first image processing unit 601 of the second image processing device 600 performs the image processing on each item of image data.

Subsequently, in a step S22, the memory writing control unit 602 of the second image processing device 600 stores the image data that has gone through the image processing in the memory 350.

Subsequently, in a step S23, it is determined whether the second image processing device 600 is to perform the skew adjustment on the image data based on the results of the skew detection in the first image processing device 500.

When the skew adjustment is to be performed ("YES" in the step S23), in a step S24, the memory reading control unit 603 of the second image processing device 600 reads the image data such that the skew will be adjusted when the image data stored in the memory 350 is to be read and obtained.

When the skew adjustment is not performed ("NO" in the step S23), in a step S25, the memory reading control unit 603 reads the image data from the memory 350 under normal operating conditions.

Subsequently, in a step S26, the second image processing unit 604 performs the image processing on the image data read by the memory reading control unit 603.

In a step S27, the image data that has gone through the image processing is output to the controller 360.

Figure 10:
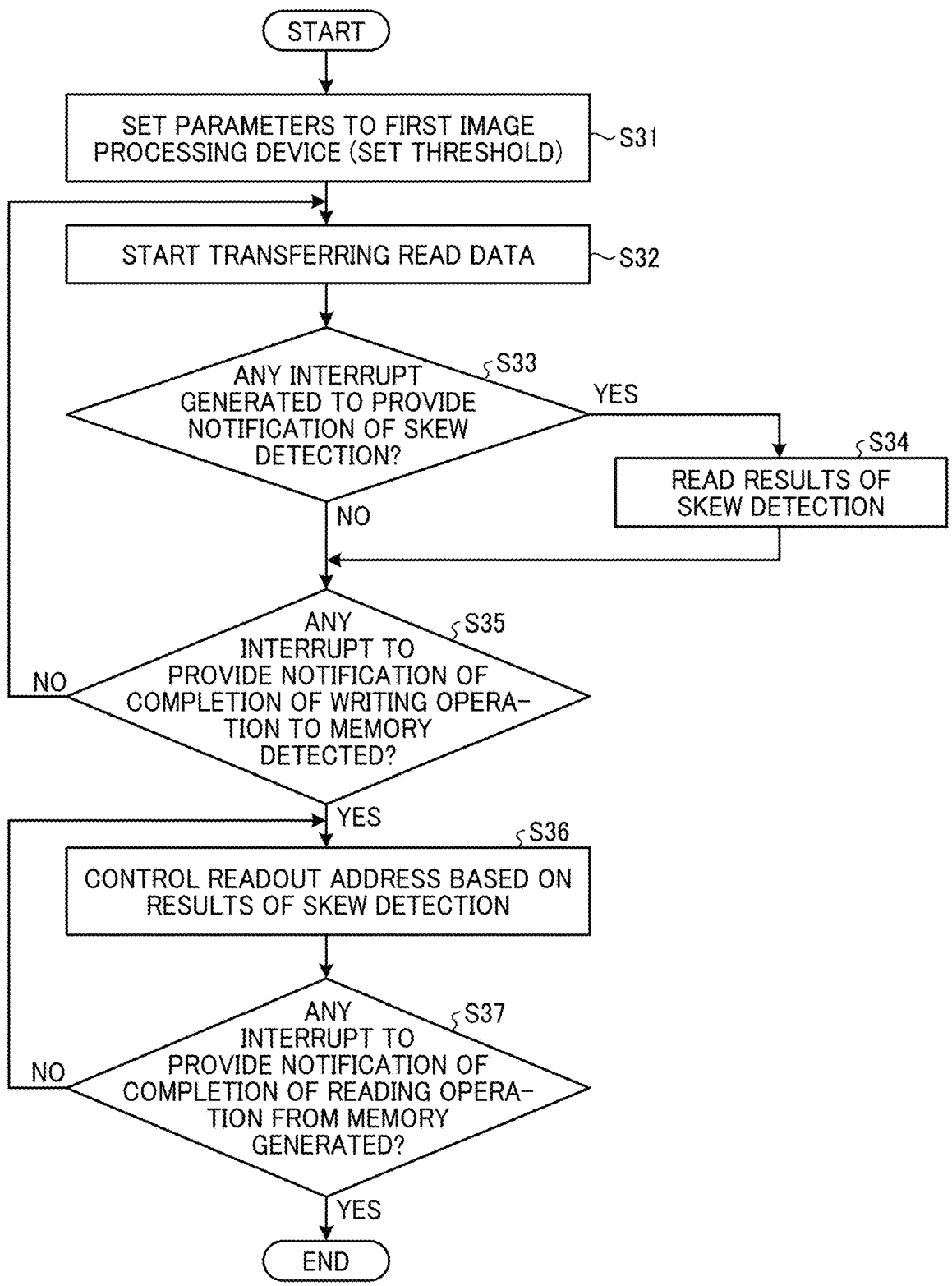
FIG. 10 is a flowchart of the controlling processes performed by a central processing unit (CPU) when the skew is to be adjusted, according to an embodiment of the present disclosure.

FIG. 10 is a flowchart of the controlling processes performed by the CPU 340 when the skew is to be adjusted, according to the present embodiment.

Firstly, in a step S31, the CPU 340 sets parameters for skew detection to the first image processing device 500 before the scanning operation starts. More specifically, the CPU 340 edits the settings to be used when the skew detection is turned on in the register 530 of the first image processing device 500, or sets, for example, a threshold used to determine whether the skew detection is to be performed.

Subsequently, in a step S32, the CPU 340 starts transferring the data read by the scanner, and waits for an interrupt generated to provide notification of the completion of the image-data transfer to the memory 350.

After that, in a step S33, the CPU 340 determines whether an interrupt is generated to provide notification of skew detection. Once the first image processing device 500 detects skew after the transfer of the data read by the scanner is started, an interrupt is generated to provide notification of skew detection. Accordingly, when such notification is detected ("YES" in the step S33), in a step S34, the CPU 340 reads the results of skew detection from the skew detection-result storage unit 513 of the first image processing device 500, and keeps the obtained results of skew detection as the data to be used when the skew is to be adjusted.

After the processes in the step S34 or when an interrupt to provide notification of skew detection is not detected ("NO" in the step S33), in a step S35, the CPU 340 determines whether any interrupt to provide notification of the completion of writing operation to the memory 350 has been detected.

When no interrupt to provide notification of the completion of the writing operation has been detected ("NO" in the step S35), the CPU 340 repeats the processes in the step S32 and the subsequent steps.

When an interrupt to provide notification of the completion of the writing operation has been detected ("YES" in the step S35), in a step S36, the CPU 340 controls the readout address based on the results of skew detection. In other words, the process shifts to the skew adjustment control.

When adjustment or correction is to be performed, the CPU 340 controls the readout address from the memory 350 based on results of skew detection obtained from the skew detection-result storage unit 513 of the first image processing device 500.

In a step S37, the CPU 340 determines whether any interrupt to provide notification of the completion of reading operation from the memory 350 has been generated. When no interrupt to provide notification of the completion of the reading operation has been generated ("NO" in the step S37), the CPU 340 repeats the processes in the step S36. When an interrupt to provide notification of the completion of the reading operation has been generated ("YES" in the step S37), the CPU 340 terminates the processes in the step S36. The degree of skew adjustment can be dynamically changed based on the results of skew detection.

Figure 11:
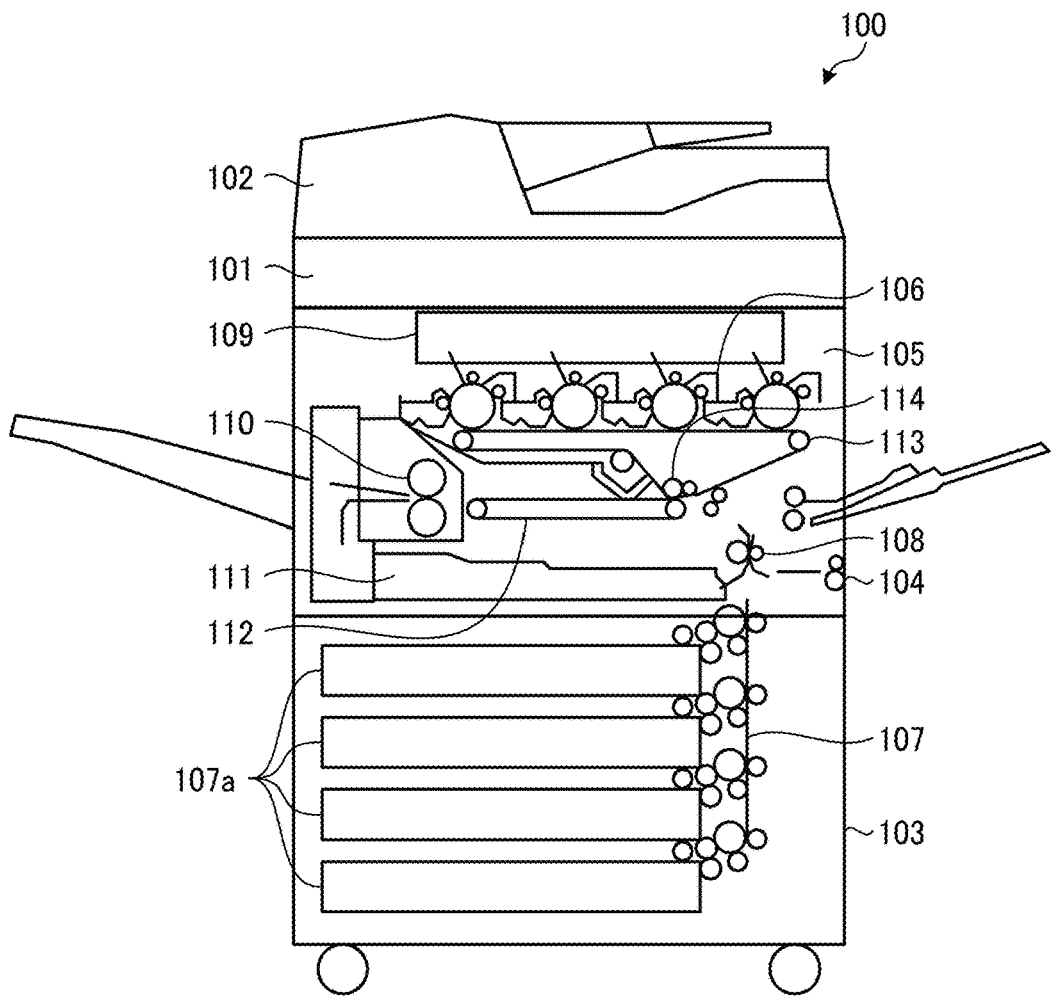
FIG. 11 is a diagram illustrating a configuration of an image forming apparatus according to an embodiment of the present disclosure.

FIG. 11 is a diagram illustrating a configuration or structure of the image forming apparatus 100 according to the first embodiment of the present disclosure.

The image forming apparatus 100 as illustrated in FIG. 11, which serves as an image processor, has at least two of a photocopying function, a printing function, a scanning function, and a facsimile (FAX) function, and is typically referred to as a multifunction printer or multifunction peripheral (MFP).

The image forming apparatus 100 is provided with an image reading device 101 and an automatic document feeder (ADF) 102 that together serve as an image reading device, and is further provided with an image forming device 103 on the downside. These multiple elements of the image forming apparatus 100 are controlled by a built-in controller board, and such a built-in controller board according to the present embodiment is a control board provided with the controller 360 (see FIG. 1), the CPU 361 (see FIG. 1), and the memory 362 (see FIG. 1). In FIG. 11, the external cover of the image forming device 103 is detached in order to illustrate and describe the inner structure.

The ADF 102 is a document supporting unit that sets a document whose image thereon is to be scanned at a scanning position. The ADF 102 automatically conveys the document placed on the placing table to a scanning position. The image reading device 101 scans and reads the document conveyed by the ADF 102 at a predetermined scanning position. Moreover, the image reading device 101 has a contact glass on the top surface, and scans the document placed on the contact glass that is the scanning position. Note that the contact glass serves as a document supporting unit on which the document is to be placed. More specifically, the image reading device 101 is an optical scanner internally provided with a solid-state image sensing device such as a light source, an optical system, and a complementary metal oxide semiconductor (CMOS) image sensor, and uses the optical system and the solid-state image sensing device to scan and read the light that is reflected from the document irradiated with the light emitted from the light source.

The image forming device 103 is provided with a manual feeding roller 104 through which a recording sheet is manually fed and a recording sheet supply unit 107 that supplies the recording sheet. The recording sheet supply unit 107 has mechanisms to feed a recording sheet from a plurality of sheet trays 107a at multiple levels. The fed recording sheet is conveyed to a secondary transfer belt 112 through a registration roller pair 108.

A toner image on the intermediate transfer belt 113 is transferred by a transfer unit 114 onto a recording sheet that is conveyed on the secondary transfer belt 112.

Moreover, the image forming device 103 includes, for example, an optical writing device 109, an image forming unit (Y, M, C, and K) 105 of tandem system, the intermediate transfer belt 113, and the secondary transfer belt 112 as described above. In the image forming processes performed by the image forming unit 105, an image that is drawn by the optical writing device 109 is formed on the intermediate transfer belt 113 as a toner image.

More specifically, the image forming unit (Y, M, C, and K) 105 includes four photoconductor drums (Y, M, C, and K) in a rotatable manner, and an image forming element 106 that includes a charging roller, a development device, a primary transfer roller, a cleaner unit, and a discharger is disposed around each one of the four photoconductor drums. As the image forming element 106 operates on each photoconductor drum, the image on the photoconductor drum is transferred onto the intermediate transfer belt 113 by each primary transfer roller.

The intermediate transfer belt 113 is arranged as extended by a drive roller and at least one driven roller at the nip between the multiple photoconductor drums and the multiple primary transfer rollers. As intermediate transfer belt 113 runs, the secondary transfer device secondarily transfers the toner image, which is transferred onto the intermediate transfer belt 113 in the primary transfer process, onto the recording sheet that is being conveyed on the secondary transfer belt 112. As the secondary transfer belt 112 runs, the recording sheet is conveyed to the fixing device 110, and the toner image is fixed on the recording sheet as a color image. After that, the recording sheet is ejected to an external output tray. When duplex printing is to be performed, the front and back sides of the recording sheet are turned by a turning mechanism 111, and the turned recording sheet is conveyed onto the secondary transfer belt 112.

The image forming device 103 is not limited to the one that forms an image by an electrophotographic method as described above. The image forming device 103 may form an image by an inkjet method.

The image reading device 101 according to the present embodiment is described below.

Figure 12:
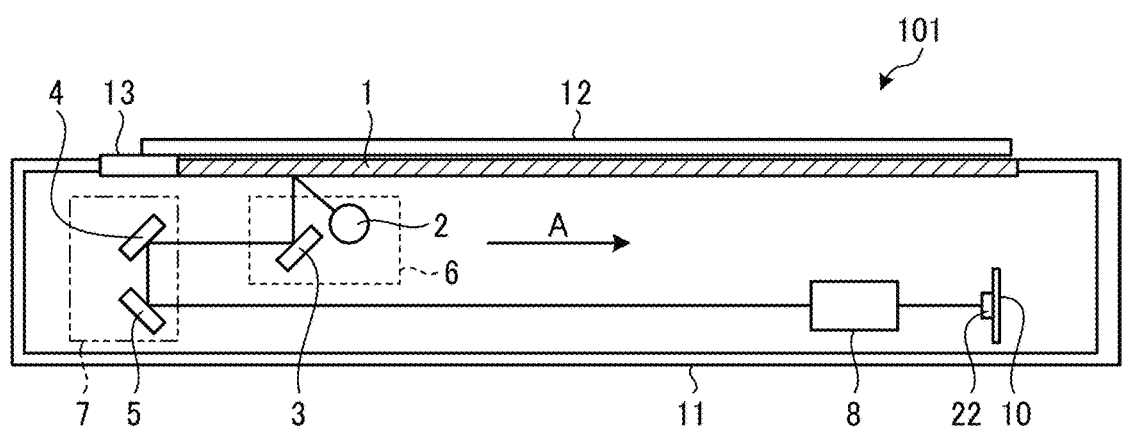
FIG. 12 is a sectional view of the structure of an image reading device, according to embodiments of the present disclosure.

FIG. 12 is a sectional view of the structure of the image reading device 101, according to the present embodiment.

As illustrated in FIG. 12, the image reading device 101 has a housing 11, and includes a sensor board 10 provided with an imaging device 22 that serves as a solid-state image sensing device, a lens unit 8, a first carriage 6, and a second carriage 7 inside the housing 11. The first carriage 6 includes a mirror 3 and a light-emitting diode (LED) that serves as a light source 2. The second carriage 7 according to the present embodiment has a mirror 4 and a mirror 5. The image reading device 101 is provided with a contact glass 1 on the top surface.

The light source 2 is configured to emit visible light or invisible light. In the present embodiment, the invisible light refers to the light having wavelengths equal to or shorter than 380 nanometers (nm) or the light having wavelengths equal to or longer than 750 nm. In other words, the light source 2 is an illumination unit that emits visible light and invisible light such as near-infrared (NIR) light to an object or a background device 13.

The image reading device 101 is provided with a background device 13, that serves as a reference white board, on the top surface. More specifically, within the capturing range of the imaging device 22, the background device 13 is arranged across the light source 2, which serves as an illumination unit, from the object.

In the reading or scanning operation, the image reading device 101 uses the light source 2 to emit the light toward the upper side while moving the first carriage 6 and the second carriage 7 from a standby position or home position in an A-direction that is the sub-scanning direction. Then, the first carriage 6 and the second carriage 7 form an image of the light reflected by a document 12 that serves as an object, on the imaging device 22 through the lens unit 8.

For example, when the power is turned on, the image reading device 101 reads or scans the light reflected by the background device 13 that serves as a reference white board, and sets the base line. In other words, upon moving the first carriage 6 to a position directly below the background device 13 that serves as a reference white board, the image reading device 101 turns on the light source 2, and forms an image of the light reflected by the background device 13 that serves as a reference white board on the imaging device 22 to modify the gain.

The imaging device 22 can capture an image in a wavelength range of visible light or an image in a wavelength range of invisible light. The imaging device 22 is provided with a plurality of pixels arranged to convert the radiation intensity of incident light into an electrical signal. These pixels are arranged in a matrix, and the electrical signals obtained from the multiple pixels are transferred to a signal processor 222 (see FIG. 13) in a later stage in a predetermined order at regular time intervals. Such an electrical signal to be transferred to the signal processor may be referred to as a pixel readout signal in the following description. On those multiple pixels of the imaging device 22, a color filter that transmits only the light with specific wavelengths is arranged. In the imaging device 22 according to the present embodiment, the multiple signals that are obtained from a group of pixels covered with a color filter of the same color are referred to as a channel. In the following description, the image that is captured by the imaging device 22 upon irradiating an object with visible light may be referred to as a visible image, and the image that is captured by the imaging device 22 upon irradiating an object with invisible light such as near-infrared light may be referred to as an invisible image.

In the present embodiment, an image reading apparatus of the reduction optical system is used as the image reading device 101. However, no limitation is indicated thereby, and an optical system of unity magnification such as a contact image sensor (CIS) of the contact optical system may be used as the image reading device 101 according to the present embodiment.

Figure 13:
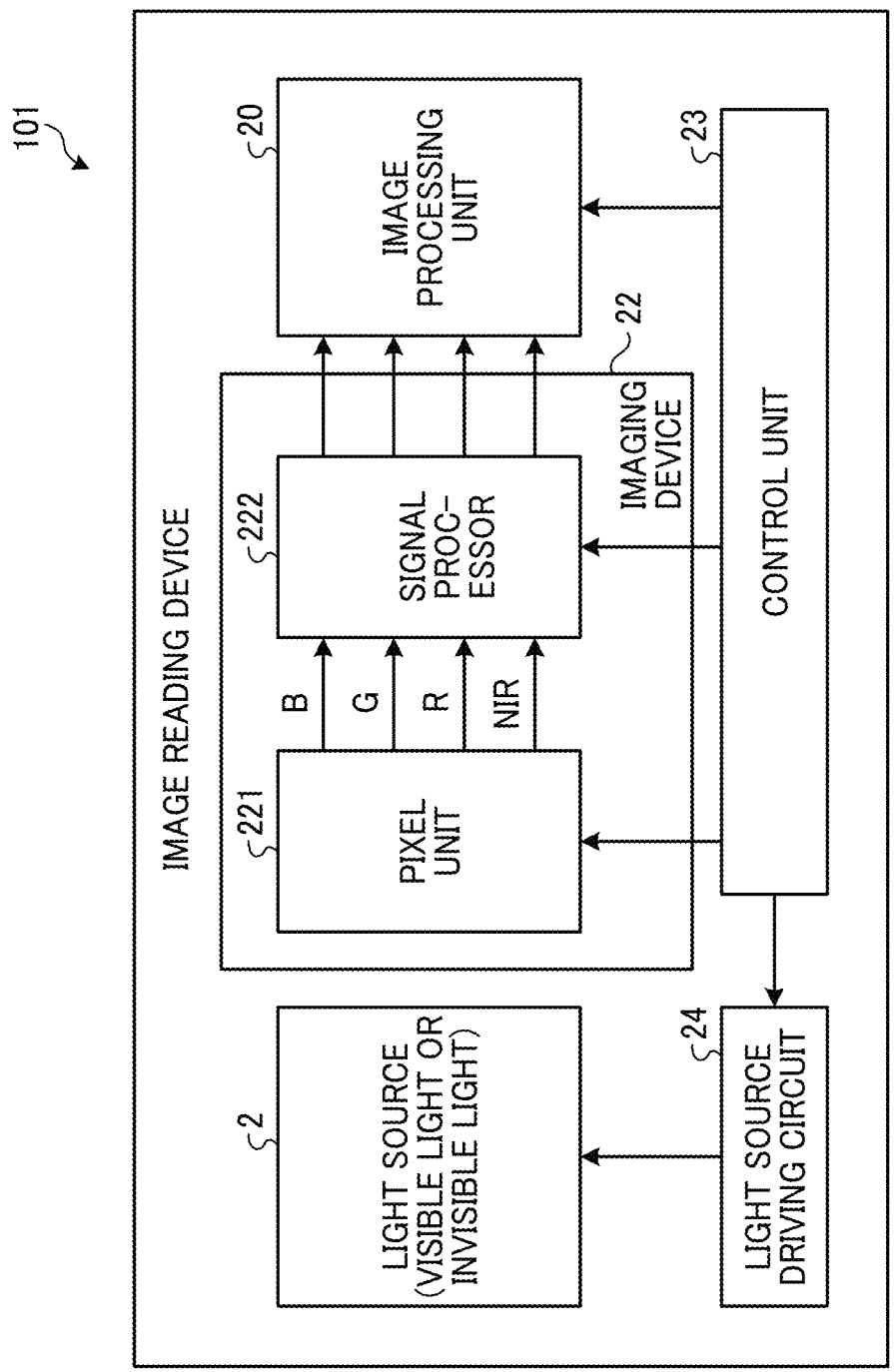
FIG. 13 is a block diagram illustrating an electrical connection of the elements of an image reading device according to an embodiment of the present disclosure.

FIG. 13 is a block diagram illustrating an electrical connection of the elements of the image reading device 101 according to the present embodiment.

As illustrated in FIG. 13, the image reading device 101 includes an image processing unit 20, a control unit 23, and a light source driving circuit 24 in addition to the imaging device 22 and the light source 2 described above. The control unit 23 controls the imaging device 22, the image processing unit 20, and the light source driving circuit 24. The light source driving circuit 24 drives the light source 2 under the control of the control unit 23. The image processing unit 20 according to the present embodiment corresponds to, for example, the first image processing device 500 (see FIG. 1) and the second image processing device 600 (see FIG. 1). The control unit 23 according to the present embodiment includes the CPU 340 (see FIG. 1) and the memory 350 (see FIG. 1). Some concrete methods of detecting and adjusting a skew are described below. For purposes of simplification, in the following description, the first image processing device 500 (see FIG. 1) and the second image processing device 600 (see FIG. 1) are not distinguished from each other in the amount-of-characteristic detection processes performed by the image processing unit 20. As described above, in the present embodiment, the amount-of-characteristic detection processes are selectively performed by the first image processing device 500 (see FIG. 1) and the second image processing device 600 (see FIG. 1) under the control of the CPU 340 (see FIG. 1). For the sake of explanatory convenience, an overlapping description is omitted in the following description.

The imaging device 22 according to the present embodiment is, for example, a complementary metal oxide semiconductor (CMOS) image sensor for a reduction optical system. The imaging device 22 according to the present embodiment corresponds to the front-side scanner 310 or the rear-side scanner 320 each of which is provided with, for example, a pixel unit 221 and a signal processor 222.

In the present embodiment, the imaging device 22 having a four-line configuration will be described. However, the imaging device 22 according to the present embodiment is not limited to a configuration having four lines. The circuit in a stage subsequent to the pixel unit 221 is not limited to the configuration illustrated in FIG. 13.

The pixel unit 221 according to the present embodiment has a group of pixels in four lines in which a plurality of pixel arrays are arranged in a matrix. The signal processor 222 performs processing on the signal output from the pixel unit 221 where appropriate, and transfers the processed signal to the image processing unit 20 in the subsequent stage.

The image processing unit 20 according to the present embodiment performs various kinds of image processing in view of the purpose of usage of the image data.

Figure 14:
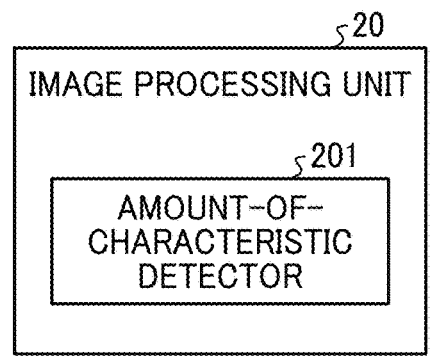
FIG. 14 is a block diagram illustrating a functional configuration of an image processing unit, according to an embodiment of the present disclosure.

FIG. 14 is a block diagram illustrating a functional configuration of the image processing unit 20, according to the present embodiment.

As illustrated in FIG. 14, the image processing unit 20 is provided with an amount-of-characteristic detector 201.

The amount-of-characteristic detector 201 detects an amount of characteristic of the document 12, which serves as an object, from the visible image or the invisible image obtained by the imaging device 22.

Figure 15:
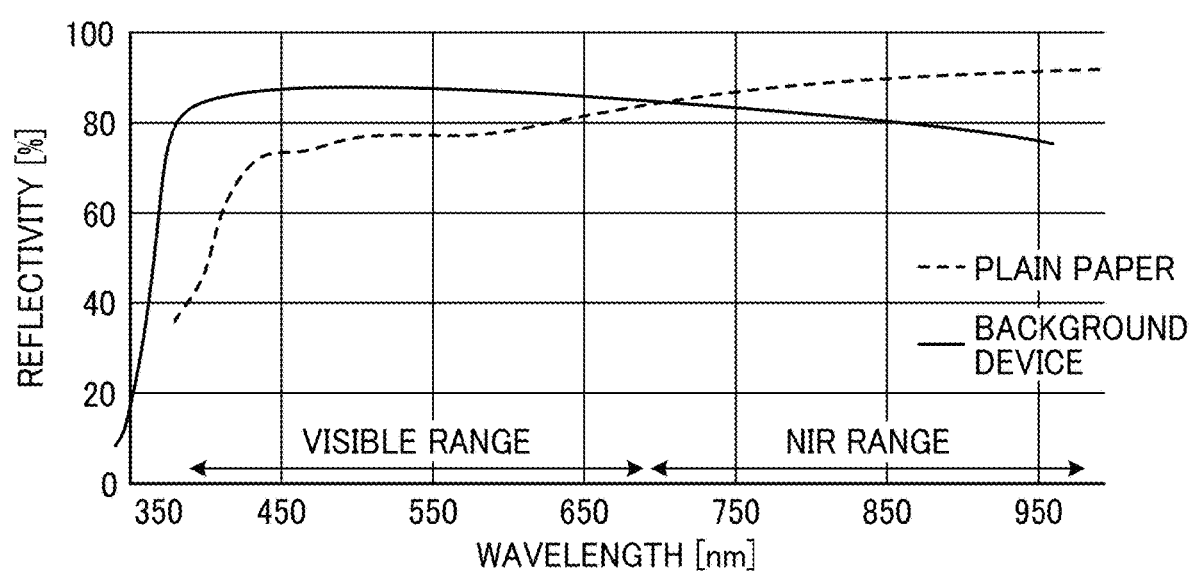
FIG. 15 is a diagram illustrating a difference in spectral reflective property depending on the type of medium involved in the detection of the amount of characteristic of an object, according to an embodiment of the present disclosure.

FIG. 15 is a diagram illustrating a difference in spectral reflective property depending on the type of medium involved in the detection of the amount of characteristic of an object, according to the present embodiment.

When the light reflected from the document 12, which serves as an object, is scanned by the imaging device 22, typically, the spectral reflective property is different from each other between the background device 13 and the document 12 that serves as an object. In the present embodiment described with reference to FIG. 15, the reflectivity of the background device 13 falls to the right, and the reflectivity of the document 12, which serves as an object, rises to the right. In other words, images having different characteristics can be obtained with visible light and invisible light. For this reason, the amount-of-characteristic detector 201 sets a visible image or invisible image to be detected in advance according to the type of the document 12, which serves as an object, or the type of the background device 13. By so doing, the amount-of-characteristic detector 201 can easily detect a desired amount of characteristic.

FIG. 16A, FIG. 16B, FIG. 16C, FIG. 16D, and FIG. 16E are diagrams each illustrating the differences in spectral reflective property between a visible image and an invisible image depending on the type of sheet, according to the present embodiment.

For example, according to the present embodiment described with reference to FIG. 16A, FIG. 16B, FIG. 16C, FIG. 16D, and FIG. 16E, when the visible image and the invisible image of a paper type A are compared with each other, it is understood that the invisible image has a greater difference in spectral reflective property with the background device 13 than the visible image. Accordingly, in the case of the sheet type A, the amount-of-characteristic detector 201 can set the object from which the amount of characteristic is to be detected to invisible images in advance. By contrast, when the visible image and the invisible image of a sheet type B are compared with each other, it is understood that the visible image has a greater difference in spectral reflective property with the background device 13 than the invisible image. Accordingly, in the case of the sheet type B, the amount-of-characteristic detector 201 can set the object from which the amount of characteristic is to be detected to visible images in advance.

The selection of a visible component as an object from which the amount of characteristic is to be extracted is described below.

Figure 17:
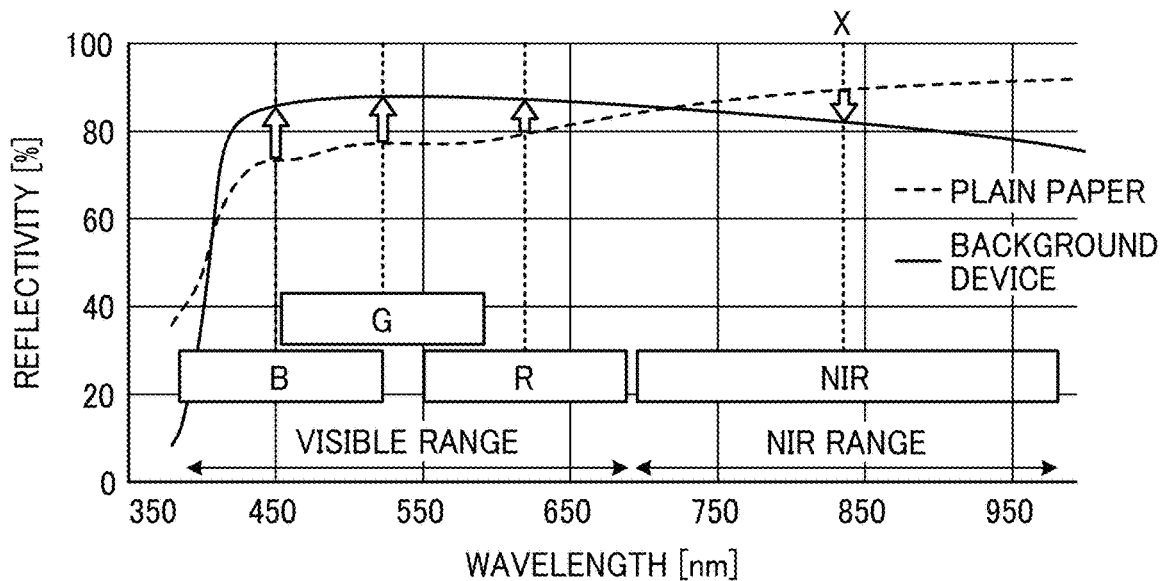
FIG. 17 is a diagram illustrating a selection of a visible component from which an amount of characteristic is to be extracted, according to an embodiment of the present disclosure.

FIG. 17 is a diagram illustrating a selection of a visible component from which an amount of characteristic is to be extracted, according to the present embodiment.

The light that is emitted has a wide wavelength range. However, in the present embodiment described with reference to FIG. 17, for purposes of simplification, the representative wavelength of each component is indicated by a dotted line. In the present embodiment, near-infrared light is used as the invisible light.

As illustrated in FIG. 17, compared with the reflectance of the background device 13 indicated by an arrow X with respect to the document 12, which serves as an object, in the near-infrared light component, the B component has the largest difference. Accordingly, by using the B component, the amount-of-characteristic detector 201 can obtain a difference in the amount of characteristic between the document 12, which serves as an object, and the background device 13.

In other words, the amount-of-characteristic detector 201 compares the difference in the spectral reflective property of the invisible light and the visible light between the background device 13 and the document 12, which serves as an object, and the amount of characteristic of the visible image includes a component having the largest difference from the invisible light. Typically, an amount of characteristic of a G component with a wide wavelength range is used from a visible image. However, in the present embodiment described with reference to FIG. 17, when the amount of characteristic of a visible range and an infrared range are used, the difference in spectral reflective property between the document and the background image board is relatively large in the B component and the infrared component. Accordingly, the edge detection can be performed easily.

The amount-of-characteristic detector 201 according to the present embodiment is not limited to a detector that extracts only the B component as the amount of characteristic to be used in the visible component, and may include, for example, a part of the RGB components with the largest value.

When the spectral reflective property of the document 12, which serves as an object, varies, the amount-of-characteristic detector 201 may determine the visible component of the selected object from which the amount of characteristic is extracted, based on, for example, the representative spectral reflective property measured from the document 12, which serves as an object, and an average value of the results of measurement.

A case in which an invisible-light low reflector is used as the background device 13 is described below.

Figure 18:
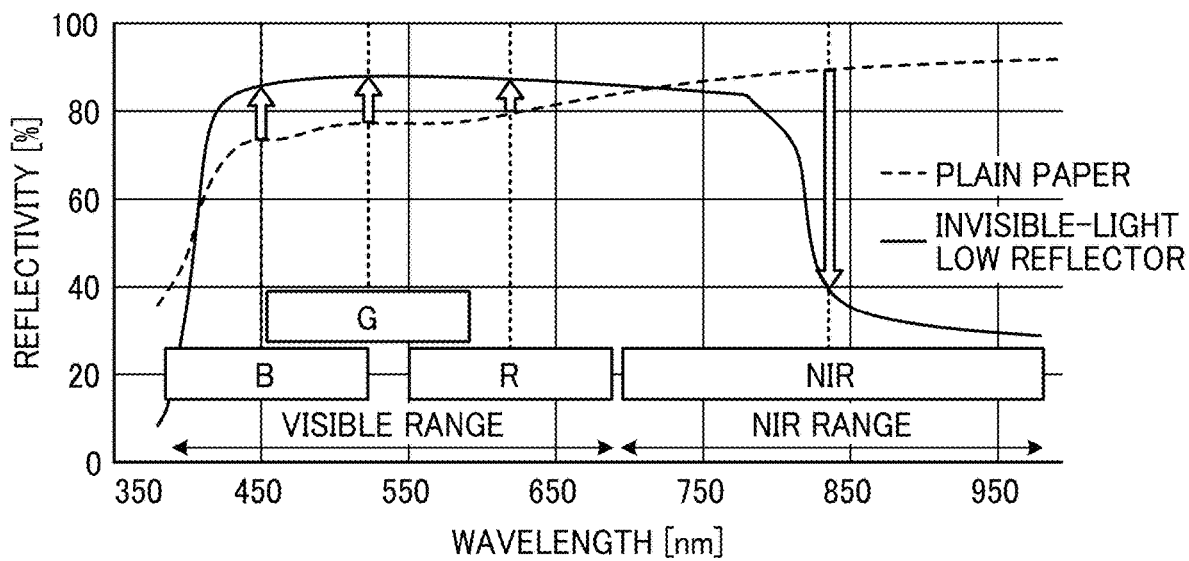
FIG. 18 is a diagram illustrating a spectral reflective property when the background device is used as an invisible-light low reflector, according to an embodiment of the present disclosure.

FIG. 18 is a diagram illustrating a spectral reflective property when the background device 13 is used as an invisible-light low reflector, according to the present embodiment.

As illustrated in FIG. 18, the background device 13 may be an invisible-light low reflector that diffusely reflects visible light and reflects invisible light at a lower reflectance than visible light. In such cases, there is a significant difference in the spectral reflectance of the background device 13 between the visible image and the invisible image. As a result, there is also a difference in the spectral reflectance between the document 12, which serves as an object, and the background device 13, and there is a greater likelihood that the amount-of-characteristic detector 201 can extract a desired amount of characteristic.

Figure 19A:
FIG. 19A, FIG. 19B, and FIG. 19C are diagrams each schematically illustrating an invisible-light low reflector according to the present embodiment.
Figure 19B:
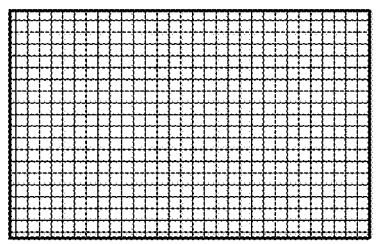
Figure 19C:
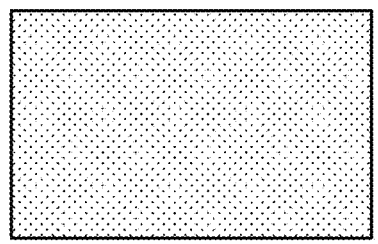

FIG. 19A, FIG. 19B, and FIG. 19C are diagrams each schematically illustrating an invisible-light low reflector according to the present embodiment.

The entirety of the background device 13 may serve as the invisible-light low reflector. Alternatively, as illustrated in FIG. 19A, FIG. 19B, and FIG. 19C, a part of the background device 13 or patterns may serve as the invisible-light low reflector.

As described above, the background device 13 includes the invisible-light low reflector that diffusely reflects visible light and reflects invisible light at a reflectance lower than that of visible light. As a result, a more significant difference can be produced between the read values of the background in the visible image and the invisible image, and robust edge detection can be performed.

Cases in which the amount-of-characteristic detector 201 extracts an edge of the document 12, which serves as an object, as an amount of characteristic are described below.

Figure 20:
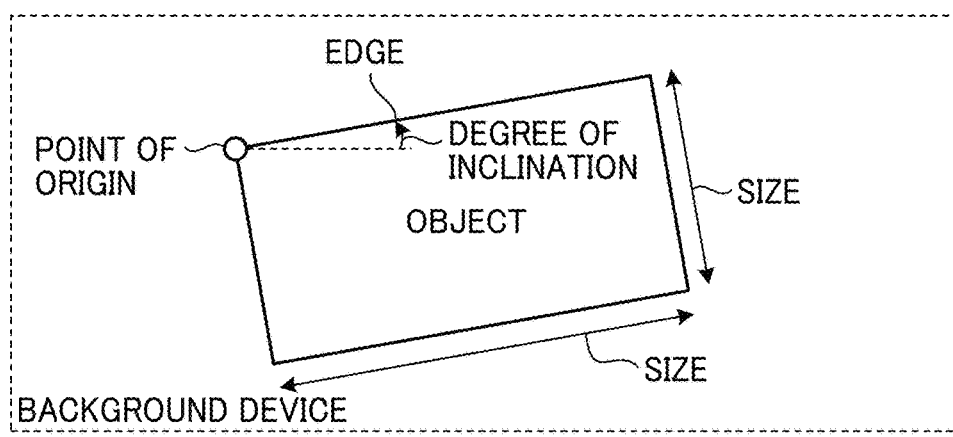
FIG. 20 is a diagram illustrating the data obtained from an edge of an object, according to an embodiment of the present disclosure.

FIG. 20 is a diagram illustrating the data obtained from an edge of an object, according to the present embodiment.

As illustrated in FIG. 20, an edge indicates the boundary between the document 12, which serves as an object, and the background device 13. By detecting such an edge, as illustrated in FIG. 20, for example, the position, the angle of inclination, and the size of the document 12, which serves as an object, can be recognized. Based on the position and the angle of inclination of the document 12, which serves as an object, image correction according to the position and the angle of inclination of the document 12, which serves as an object, can be performed in a later processing step.

Figures 21A, 21B:
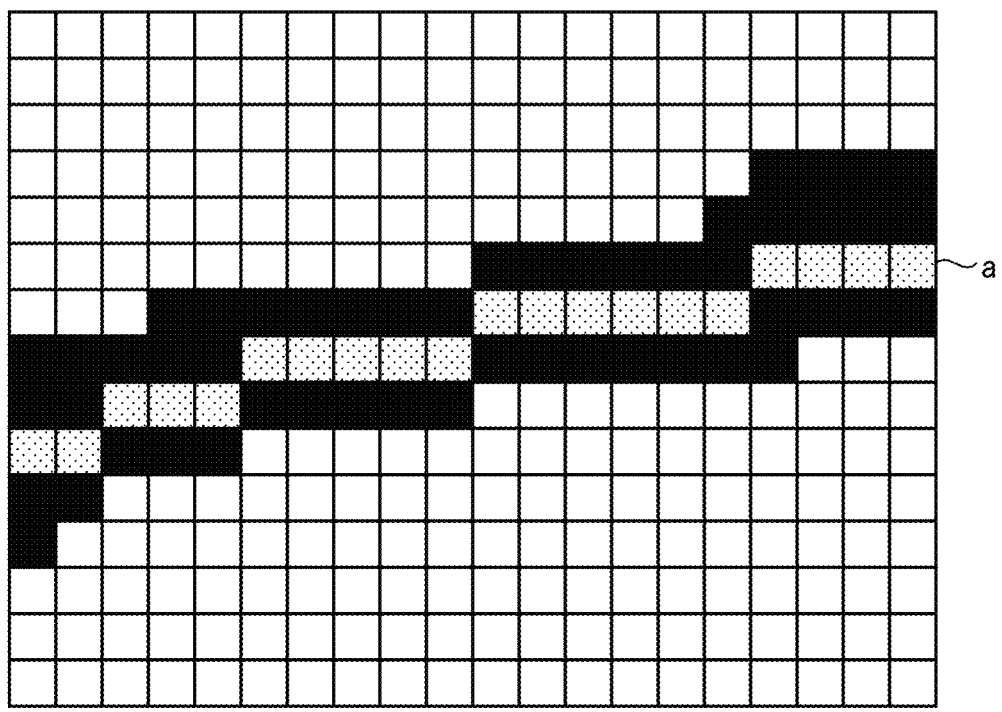
FIG. 21A and FIG. 21B are diagrams each illustrating a method of detecting an edge, according to an embodiment of the present disclosure.

FIG. 21A and FIG. 21B are diagrams each illustrating a method of detecting an edge, according to the present embodiment.

In order to detect an edge, for example, as illustrated in FIG. 21A, a first-order differential filter may be applied to the entire image, and each pixel may be binarized depending on whether the pixel has a value exceeding a prescribed threshold. In such a method, the edge in the horizontal direction appears continuously by several pixels in the vertical direction depending on the threshold, and vice versa. This is because edges are typically blurred due to the MTF characteristics of the optical system. In order to deal with such a situation, as illustrated in FIG. 21B, for example, the center of the continuous pixels may be selected as indicated by "a" in FIG. 2113 to obtain a representative edge pixel for, for example, the calculation of a regression line and the detection of size. The calculation of a regression line and the detection of size will be described later in detail.

Figure 22A:
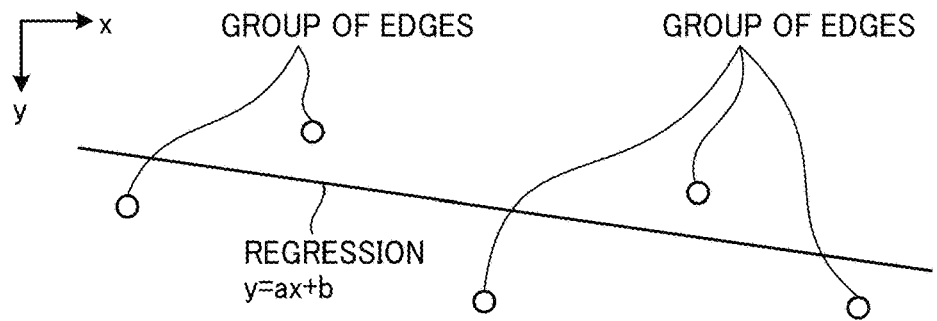
FIG. 22A and FIG. 22B are diagrams each illustrating how the amount of characteristic is extracted based on edges, according to an embodiment of the present disclosure.
Figure 22B:
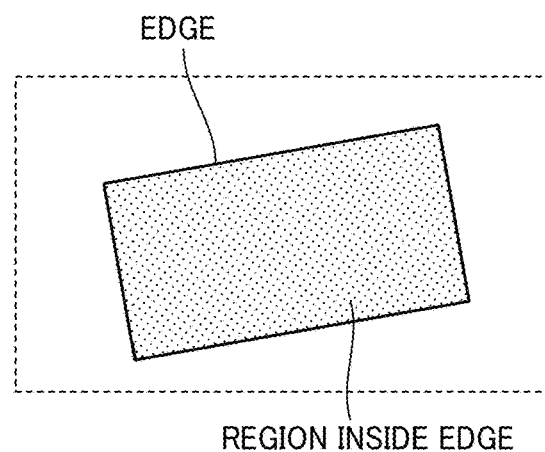

FIG. 22A and FIG. 22B are diagrams each illustrating how the amount of characteristic is extracted based on edges, according to the present embodiment.

The amount of characteristic may be obtained from the edge extracted from an image, instead of the edge itself extracted from the image. For example, as illustrated in FIG. 22A and FIG. 22B, the regression line calculated from an extracted group of edges using, for example, a method of least squares (see, in particular. FIG. 22A) or an area inside the edges including an aggregate of points (see, in particular, FIG. 22B) may be used. As for the regression line, a method may be adopted in which one linear expression is obtained from all the edges of the multiple sides. However, no limitation is indicated thereby, and a method may be adopted in which a plurality of linear expressions are separately calculated and obtained from a plurality of regions and a representative one of the multiple linear expressions is selected or representative ones of the multiple linear expressions are integrated. When a final linear expression is to be obtained in the above configuration, a linear expression having a median angle of inclination may be obtained, or an average value of a plurality of linear expressions may be obtained.

Figure 23:
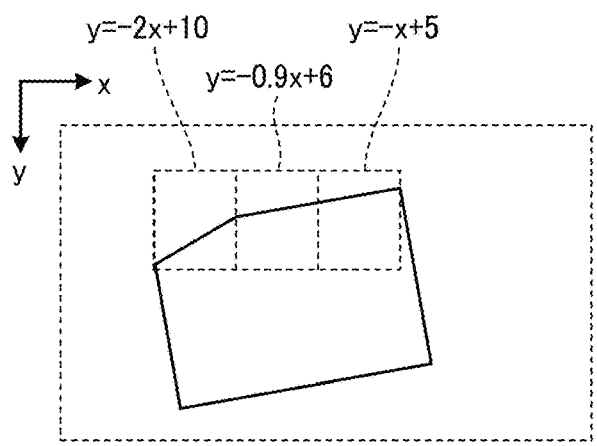
FIG. 23 is a diagram illustrating the selection of a linear expression in a regression line, according to an embodiment of the present disclosure.

FIG. 23 is a diagram illustrating the selection of a linear expression in a regression line, according to the present embodiment.

In the present embodiment described with reference to FIG. 23, a plurality of linear expressions are separately calculated and obtained from a plurality of regions, and a representative one of the multiple linear expressions is selected or representative ones of the multiple linear expressions are integrated. Due to such a configuration, even when, for example, an edge of the document 12, which serves as an object, is damaged or lost, the angle of inclination of the document 12, which serves as an object, can be recognized with a high degree of precision.

As described above, the amount-of-characteristic detector 201 extracts the edges of the document 12, which serves as an object, as the amount of characteristic. As a result, the area of the document 12, which serves as an object, can be detected.

The size detection of the document 12 that serves as an object is described below.

Figure 24:
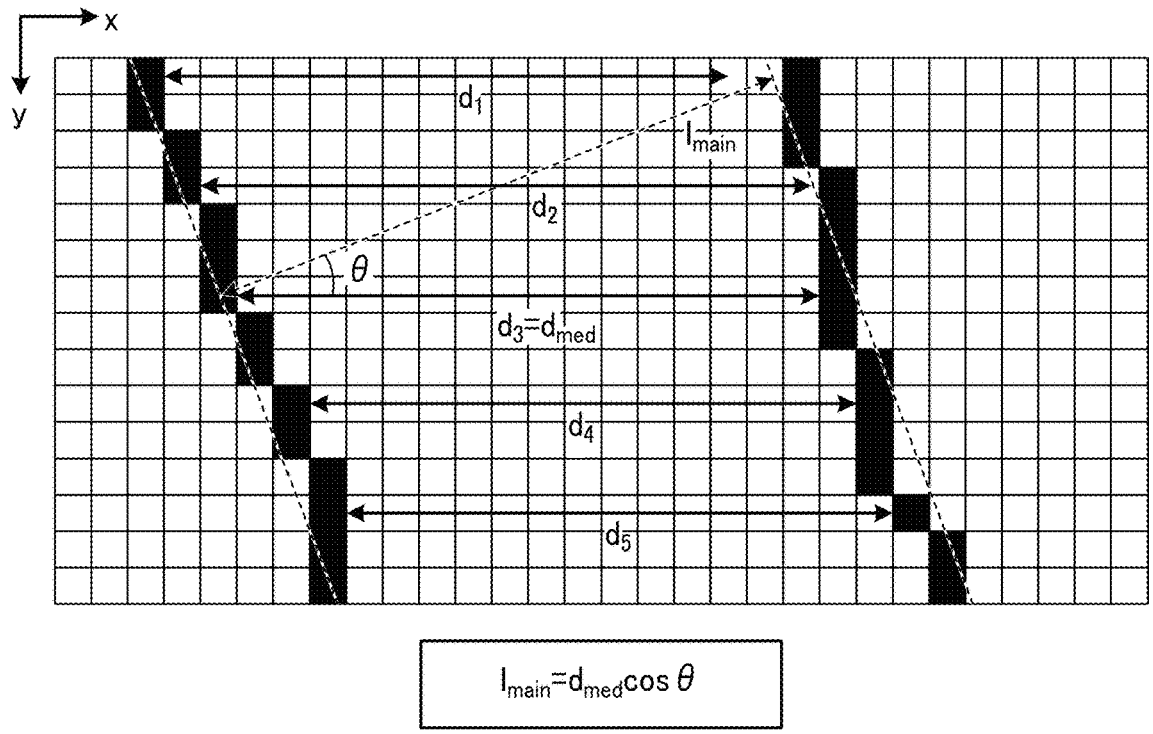
FIG. 24 is a diagram illustrating the detection of a size in the horizontal direction, according to an embodiment of the present embodiment.

FIG. 24 is a diagram illustrating a size detection in the horizontal direction, according to the present embodiment.

As illustrated in FIG. 24, the distance between the right edge and the left edge of the document 12, which serves as an object, is obtained with respect to the representative position in the vertical direction of the image, and the size in the horizontal direction can be calculated based on the median of the distance between those edges and the angle of inclination that is calculated independently. In a similar manner to the above, the size in the vertical direction can be calculated.

For example, the size data as detected above can be used for the error detection and the image correction processes in a later step. For example, when scanning is performed by a multifunction peripheral (MFP), the error detection according to the present embodiment may be the detection of a size different from a document size set in advance. When such a size is detected, a notification that a document of correct size should be set is given.

As described above, according to the above embodiments of the present disclosure, the amount of characteristic of the document 12 or the background device 13, which serves as an object, is detected from at least one of the visible image and the invisible image. Due to such a configuration, the data that cannot be obtained from the visible image can be obtained from the invisible image. For this reason, stable edge detection between the document and the background image is possible regardless of the document type.

The imaging device 22 according to the present embodiment receives the visible light and invisible light reflected by the document 12, which serves as an object, and captures a visible image and an invisible image. Accordingly, the image scanning can be performed with a relatively simple configuration or structure.

As the invisible light and the invisible image are infrared light and an infrared image, the image can be read with a simple configuration.

Without being limited to the above-described method, the NIR plate may be sent to the second image processing device and transferred to the memory as it is such that processing using the NIR plate is performed under the control of the CPU.

According to the first embodiment of the present disclosure, using a hardware configuration in which image processing is performed on a visible scanned image to adjust a skew, a skew adjustment with a high degree of precision can be performed based on an invisible scanned image with a relatively simple configuration.

Second Embodiment

A second embodiment of the present disclosure is described below.

In the second embodiment of the present disclosure, the amounts of characteristic are extracted in advance from both the visible image and the invisible image and these amounts of characteristic are automatically selected or integrated. Such a configuration or structure of the second embodiment is different from the configuration or structure of the first embodiment of the present disclosure. Note that like reference signs are given to elements similar to those described in the first embodiment, and their detailed description is omitted in the description of the second embodiment of the present disclosure.

Figure 25:
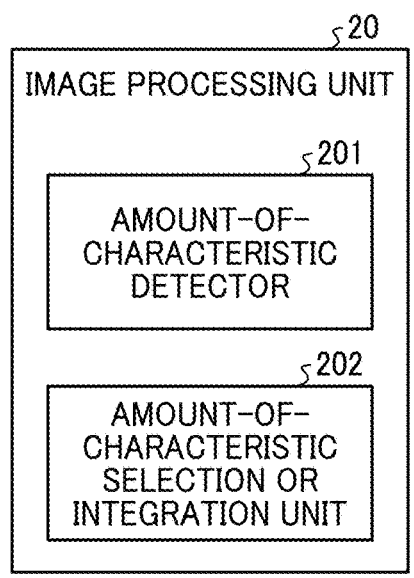
FIG. 25 is a block diagram illustrating a functional configuration of an image processing unit, according to a second embodiment of the present disclosure.

FIG. 25 is a block diagram illustrating a functional configuration of the image processing unit 20 according to the second embodiment.

As illustrated in FIG. 25, the image processing unit 20 according to the second embodiment of the present disclosure includes an amount-of-characteristic selection or integration unit 202 in addition to the amount-of-characteristic detector 201.

AS described above, the amount-of-characteristic detector 201 detects an amount of characteristic of the document 12, which serves as an object, and the background device 13 from at least one of the visible image or the invisible image obtained by the imaging device 22.

The amount-of-characteristic selection or integration unit 202 according to the present embodiment selects or integrates the amount of characteristic detected from each image based on the amount of characteristic of the document 12, which serves as an object, or the background device 13, which is detected by the amount-of-characteristic detector 201 from at least one of the visible image or the invisible image.

More specifically, the amount-of-characteristic selection or integration unit 202 automatically performs the selection processes described above in the first embodiment of the present disclosure. Due to such a configuration, with the combination of the visible image and the invisible image, a desired amount of characteristic can be obtained even from the document 12, which serves as an object, from which a target amount of characteristic could not be extracted based on the visible image or the invisible image.

Figure 26:
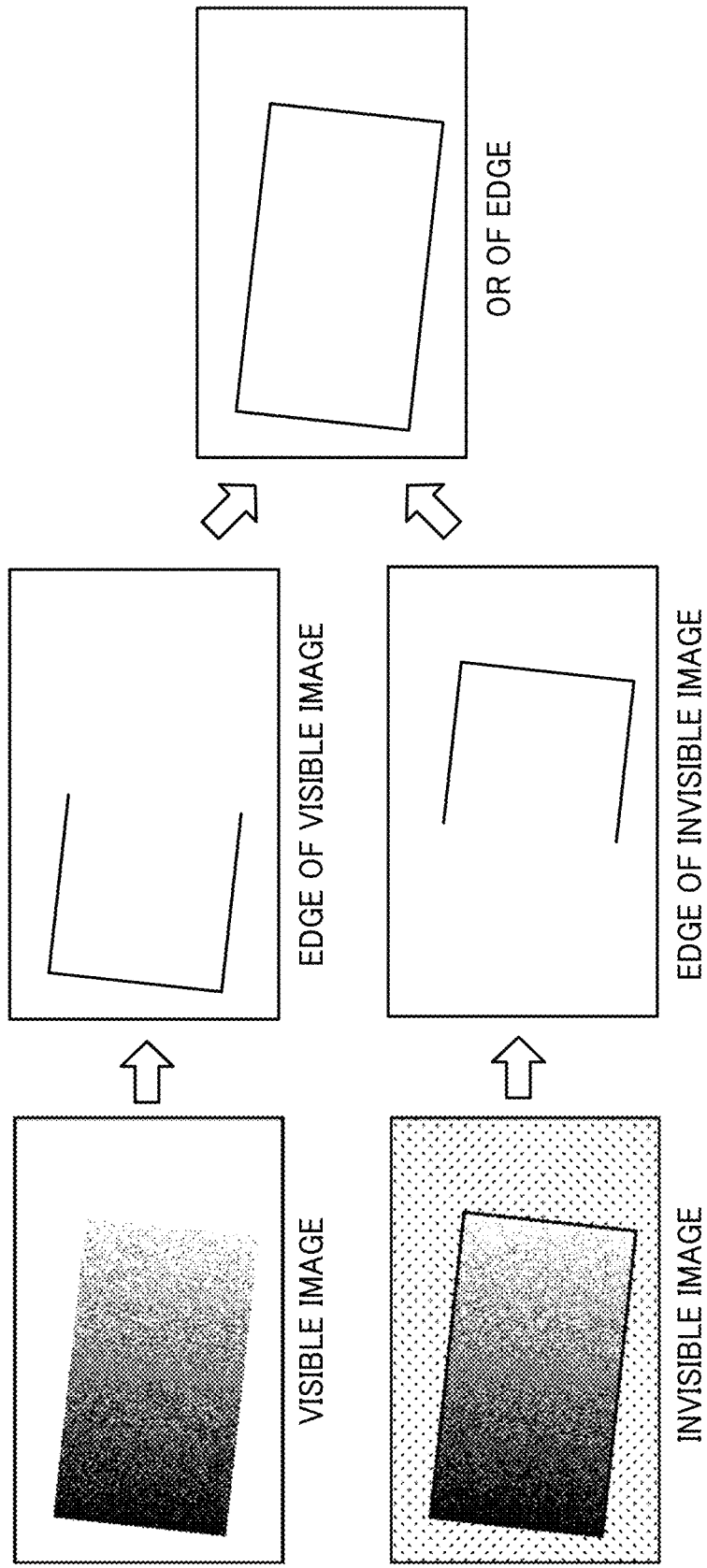
FIG. 26 is a diagram illustrating the OR operation performed on edges, according to the second embodiment of the present disclosure.

FIG. 26 is a diagram illustrating the OR operation performed on edges by the amount-of-characteristic selection or integration unit 202, according to the second embodiment of the present disclosure.

The amount-of-characteristic selection or integration unit 202 according to the present embodiment performs the OR operation on the edges when the edges of the document 12, which serves as an object, are extracted as an amount of characteristic.

A logical OR is obtained for each one of the edges extracted from the invisible image and the visible image. By so doing, a portion where an edge cannot be obtained in one of the invisible image and the visible image can be complemented by the other one of the invisible image and the visible image. For example, as illustrated in FIG. 26, in the case of a gradation document, an edge of a black region of the document is easy to be taken in a visible image and an edge of a white region is difficult to be taken in a visible image, but the edges are reversed in an invisible image.

Accordingly, the amount-of-characteristic selection or integration unit 202 combines the edge of the black region in the visible image and the edge of the white region in the invisible image to extract the edge of the entire document that cannot be obtained from only one image.

As described above, the amount-of-characteristic selection or integration unit 202 according to the present embodiment performs the OR operation to integrate the edges of the invisible image and the edges of the visible image. Due to such a configuration, some edges can be detected from either one of the visible image or the invisible image. Accordingly, an edge between the document 12, which serves as an object, and the background device 13 can easily be detected at a large number of points.

The priority to be given to an edge of an invisible image is described below.

Figure 27A:
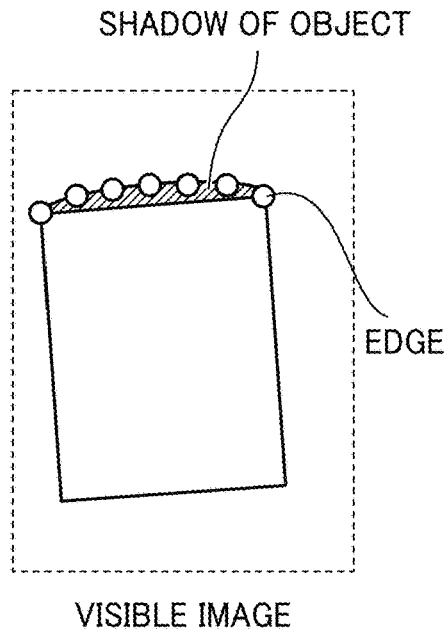
FIG. 27A and FIG. 27B are diagrams illustrating how edges appear in a visible image and an invisible image, respectively, according to the second embodiment of the present disclosure.
Figure 27B:
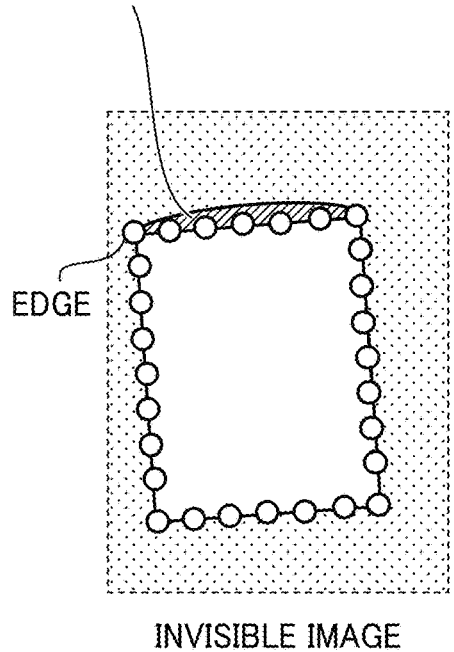

FIG. 27A and FIG. 27B are diagrams illustrating how edges appear in a visible image and an invisible image, respectively, according to the present embodiment.

As illustrated in FIG. 27A, there are some cases in which the shade of the document 12, which serves as an object, is reflected, and captured into the background image of the visible image. The edges cannot be linearly extracted depending on the shape of the shade, and the accuracy of the detection of the angle of inclination of the document 12, which serves as an object, tends to be affected. By contrast, on a portion of the visible image where there is no shade, there is a high possibility that edge extraction cannot be done when the document 12, which serves as an object, is white.

As illustrated in FIG. 27B, especially when an invisible-light low reflector is used as the background device 13, an edge between the document 12, which serves as a white object, and the background device 13 can easily be extracted in the invisible image. Even in an invisible image, the shade of the document 12, which serves as an object, may appear. However, the shade is darker than the background device. For this reason, for example, a first-order differential filter that detects an edge where a dark portion turns to a bright portion may be used to detect the edges between the shade and the document instead of the edges between the shade and the background device. Alternatively, even when two kinds of first-order differential filters that detect both an edge where a dark portion turns to a bright portion and an edge where a bright portion turns to a dark portion are adopted, as long as the luminance is close to that of the background device 13, the edge between the shade and the background device 13 does not need to be extracted. Accordingly, it is more likely that an invisible image can detect an edge between the document 12, which serves as an object, and the background device 13 accurately than a visible image, and it is desired that a visible image be used only when the edges of the invisible image could not be detected under normal operating conditions.

Figure 28:
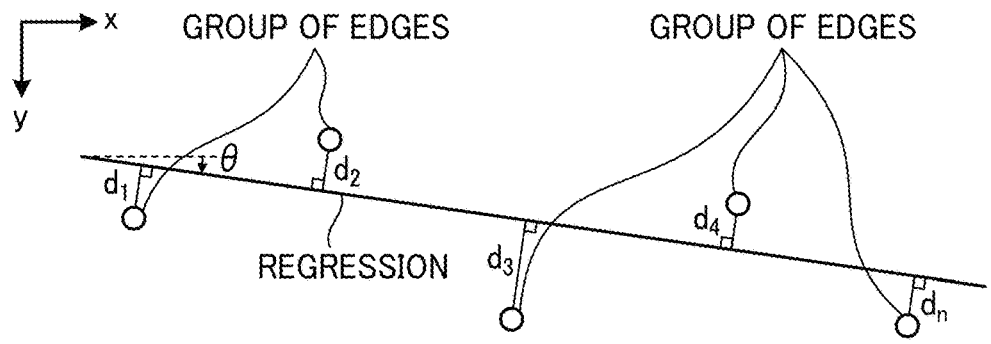
FIG. 28 is a diagram illustrating a case in which an edge is detected under normal operating conditions, according to the second embodiment of the present disclosure.

FIG. 28 is a diagram illustrating a case in which an edge is detected under normal operating conditions, according to the second embodiment of the present disclosure.

As illustrated in FIG. 28, for example, the detection is performed under normal operating conditions when an error obtained in a method of least squares is equal to or smaller than a threshold when the obtained group of edges is regressed by a straight line. Alternatively, the detection is performed under normal operating conditions when the tilt angle of a straight line is equal to or smaller than a threshold. When some of the above-described multiple linear expressions are to be selected or the above-described multiple linear expressions are to be integrated, the number of linear expressions that are detected under normal operating conditions should be equal to or greater than the threshold.

As described above, the amount-of-characteristic selection or integration unit 202 according to the present embodiment selects the edge as an edge of an invisible image when the edge of the invisible image is detected under normal operating conditions, and selects the edge as an edge of a visible image when the edge of the invisible image cannot be detected under normal operating conditions. In such cases, the edge of the invisible image can more easily be detected, and the accuracy of the detection can be improved.

Cases in which an edge could not be detected under normal operating conditions in any one of the visible image and the invisible image are described below.

Figure 29A:
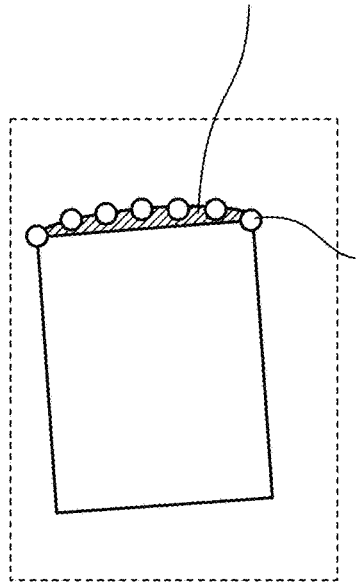
FIG. 29A, FIG. 29B, and FIG. 29C are diagrams each illustrating a failure in OR operation to be performed on edges, according to the second embodiment of the present disclosure.
Figure 29B:
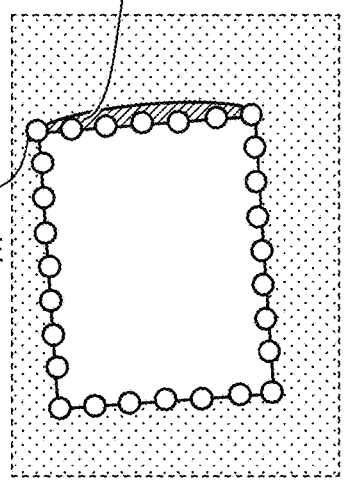
Figure 29C:
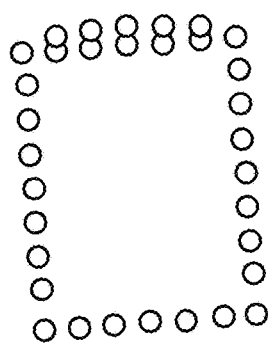

FIG. 29A, FIG. 29B, and FIG. 29C are diagrams each illustrating a failure in OR operation to be performed on edges, according to the second embodiment of the present disclosure.

If the OR operation is performed on both the visible image and the invisible image, there is a possibility that undesired edges are extracted. For example, as illustrated in FIG. 29A, FIG. 29B, and FIG. 29C, when an edge is unintentionally extracted between the shade of the document 12, which serves as an object, and the background device 13 on the visible image, the shade of the document 12, which serves as an object, remains due to the OR operation, and for example, the calculation of the angle of inclination of the document tends to be affected. However, as described above, it is advantageous that the number of edge detection points increases by the OR operation. For this reason, the amount-of-characteristic detector 201 performs the OR operation only when the edges on both the visible image and the invisible image could not be detected under normal operating conditions.

As described above, the amount-of-characteristic selection or integration unit 202 according to the present embodiment performs the OR operation on the edges of the invisible image and the edges of the visible image when the edges on both the visible image and the invisible image could not be detected under normal operating conditions. Between a visible image and an invisible image, the edges may appear differently depending on, for example, the shades of the document. For this reason, the OR operation is performed only when edges on both images could not be detected under normal operating conditions.

Figure 30A:
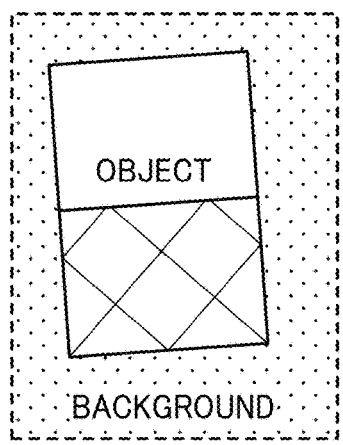
FIG. 30A and FIG. 30B are diagrams each illustrating an object in which a plurality of kinds of characteristics are mixed.
Figure 30B:
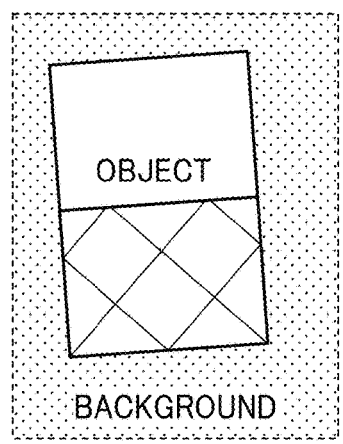

FIG. 30A and FIG. 30B are diagrams each illustrating an object in which a plurality of kinds of characteristics are mixed.

As illustrated in FIG. 30A and FIG. 30B, for example, in the document 12, which serves as an object, where a plurality of characteristics are mixed, a lower portion of the document 12, which serves as an object, can be extracted from the visible image, and an upper portion of the document 12, which serves as an object, can be extracted from the invisible image.

As described above, according to the above embodiments of the present disclosure, in the visible image and the invisible image, the amount of characteristic of the document 12 or the background device 13, which serves as an object, is detected from at least one of the visible image and the invisible image, and the amount of characteristic detected from each image is selected or integrated. As a result, an amount of characteristic can be automatically selected from one of the visible image and the invisible image. Alternatively, the amounts of characteristic of both the visible image and the invisible image can be integrated.

Third Embodiment

A third embodiment of the present disclosure is described below.

The third embodiment of the present disclosure is different from the first embodiment and the second embodiments of the present disclosure as described above in a respect that an image correction unit 203 that corrects the image of an object is further provided. Note that like reference signs are given to elements similar to those described in the first embodiment and the second embodiment, and their detailed description is omitted in the following description of the third embodiment of the present disclosure.

Figure 31:
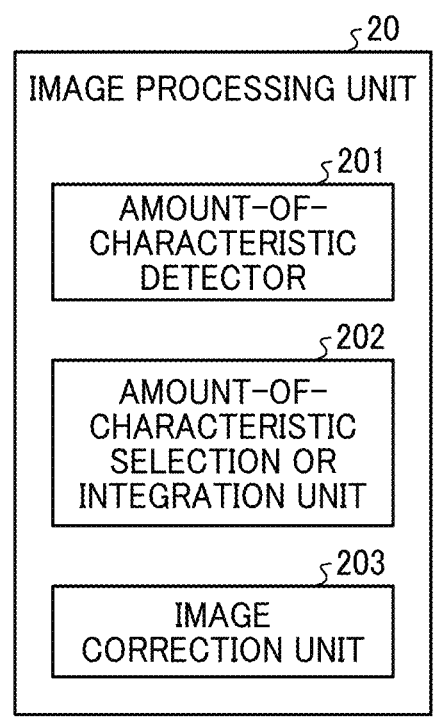
FIG. 31 is a block diagram illustrating a functional configuration of an image processing unit, according to a third embodiment of the present disclosure.

FIG. 31 is a block diagram illustrating a functional configuration of the image processing unit 20 according to the third embodiment.

Figure 32:
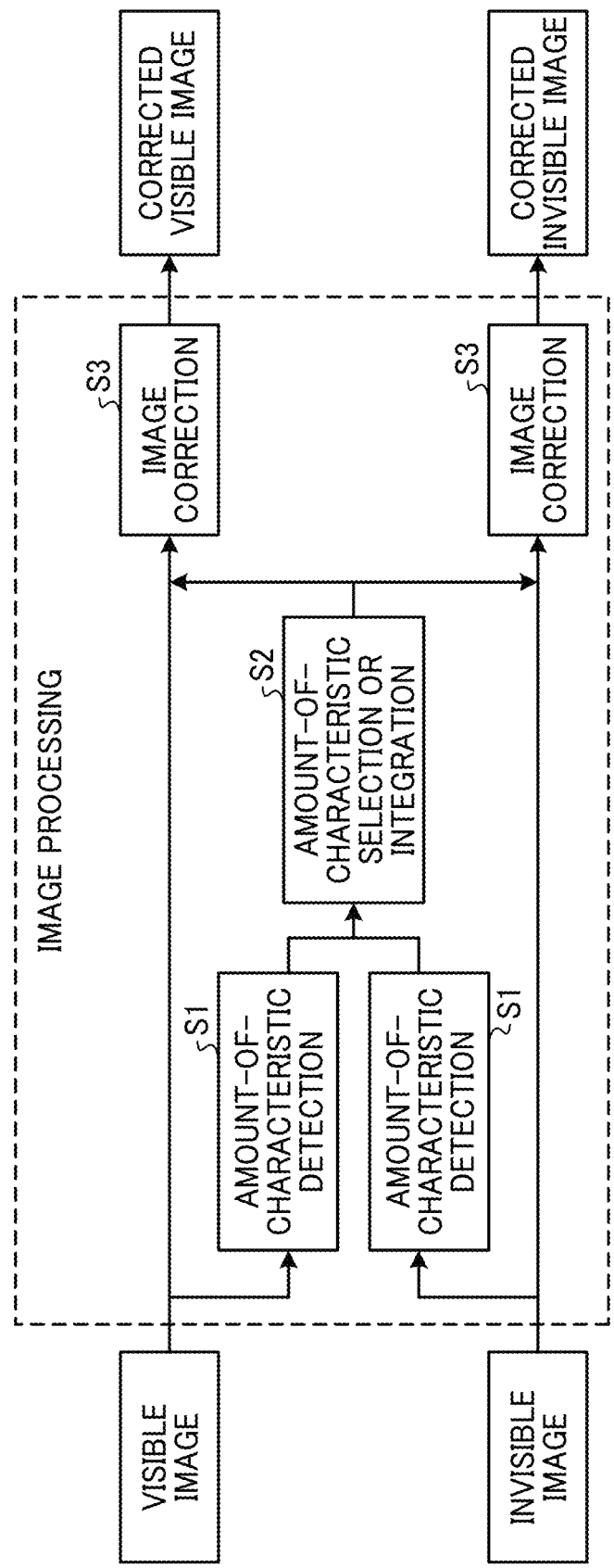
FIG. 32 is a flowchart of the processes to be performed by an image processing device, according to the third embodiment of the present disclosure.

FIG. 32 is a flowchart of the processes to be performed by the image processing device, according to the third embodiment of the present disclosure.

As illustrated in FIG. 31, the image processing unit 20 according to the third embodiment of the present disclosure includes an image correction unit 203 in addition to the amount-of-characteristic detector 201 and the amount-of-characteristic selection or integration unit 202.

As illustrated in FIG. 32, in a step S1, the amount-of-characteristic detector 201 detects the amount of characteristic of the document 12, which serves as an object, or the background device 13, which is detected from at least one of the visible image or the invisible image obtained by the imaging device 22.

As illustrated in FIG. 32, in a step S2, the amount-of-characteristic selection or integration unit 202 according to the present embodiment selects or integrates the amount of characteristic detected from each image based on the amount of characteristic of the document 12, which serves as an object, or the background device 13, which is detected by the amount-of-characteristic detector 201 from at least one of the visible image or the invisible image.

As illustrated in FIG. 32, in a step S3, the image correction unit 203 performs the image correction on each one of the visible image and the invisible image using the results of integration performed by the amount-of-characteristic selection or integration unit 202. Concrete examples of such image correction will be described later.

Figure 33:
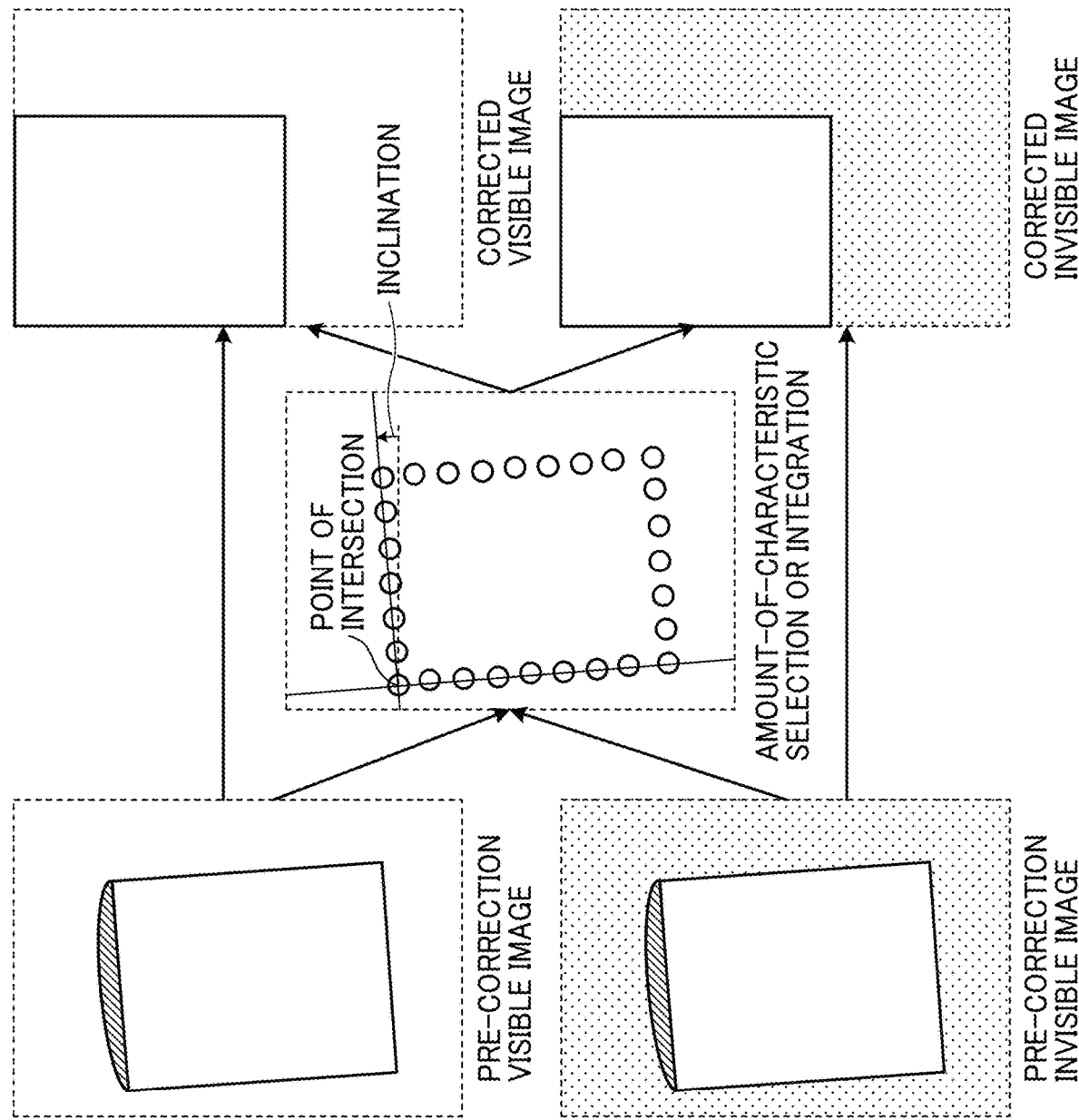
FIG. 33 is a diagram illustrating how the inclination and position of an object are corrected, according to the third embodiment of the present disclosure.
Figure 34A:
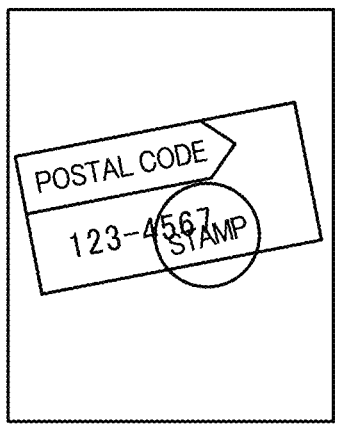
FIG. 34A, FIG. 34B, FIG. 34C, and FIG. 34D are diagrams each illustrating how an invisible image is used, according to the third embodiment of the present disclosure.
Figure 34B:
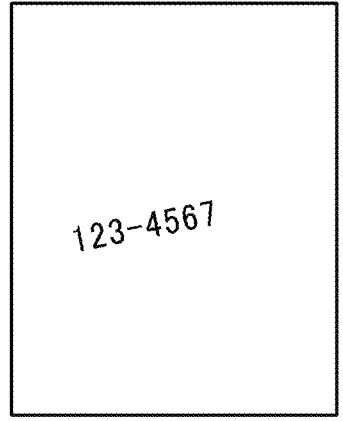
Figure 34C:
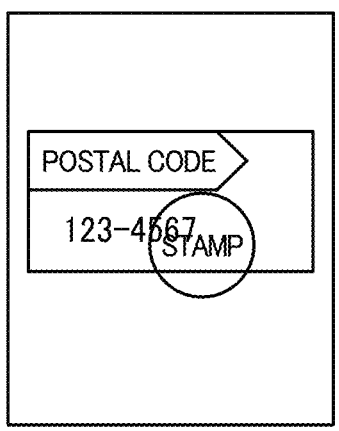
Figure 34D:
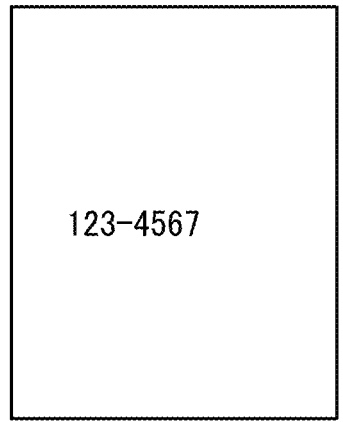

FIG. 33 is a diagram illustrating how the inclination and position of an object are corrected, according to the third embodiment of the present disclosure.

In the present embodiment described with reference to FIG. 33, the image correction unit 203 corrects the inclination and position of the document 12, which serves as an object, based on the amount of characteristic detected by the amount-of-characteristic selection or integration unit 202.

For the correction of the angle of inclination of the document 12, which serves as an object, as described above, the image correction unit 203 according to the present embodiment uses a method in which the angle of inclination when the group of edges that are extracted from the multiple sides of the document 12, which serves as an object, is regressed by a straight line is obtained and the overall image is rotated based on the obtained angle of inclination.

For the correction of the position of the document 12, which serves as an object, the image correction unit 203 according to the present embodiment uses a method in which the point of intersection of a pair of regression lines of a group of edges of the upper side and the left side of the document 12, which serves as an object is obtained and the obtained point of intersection is moved to the point of origin.

FIG. 34A, FIG. 34B, FIG. 34C, and FIG. 34D are diagrams each illustrating how an invisible image is used, according to the third embodiment of the present disclosure.

By correcting the image based on the result of integration performed by the amount-of-characteristic selection or integration unit 202, there may be an advantageous effect that, for example, the viewability or visibility of pictures and characters in the document area increases. The reflectance of the invisible component greatly differs from that of the visible component depending on the coloring material. As a result, as illustrated in FIG. 34A, FIG. 34B, FIG. 34C, and FIG. 34D, white blooming can be caused. In view of these circumstances where white blooming can be caused, for example, an optical character recognition (OCR) operation can be performed in a later stage. Accordingly, there is an advantage that the preliminary correction of not only the visible image but also the invisible image can contribute to the enhancement of the accuracy of the OCR.

As described above, by correcting the angle of inclination and position of the document 12, which serves as an object, based on the edge detection result, the document 12, which serves as an object, can be corrected achieving better viewability. Moreover, the accuracy of the OCR may be enhanced.

Figure 35:
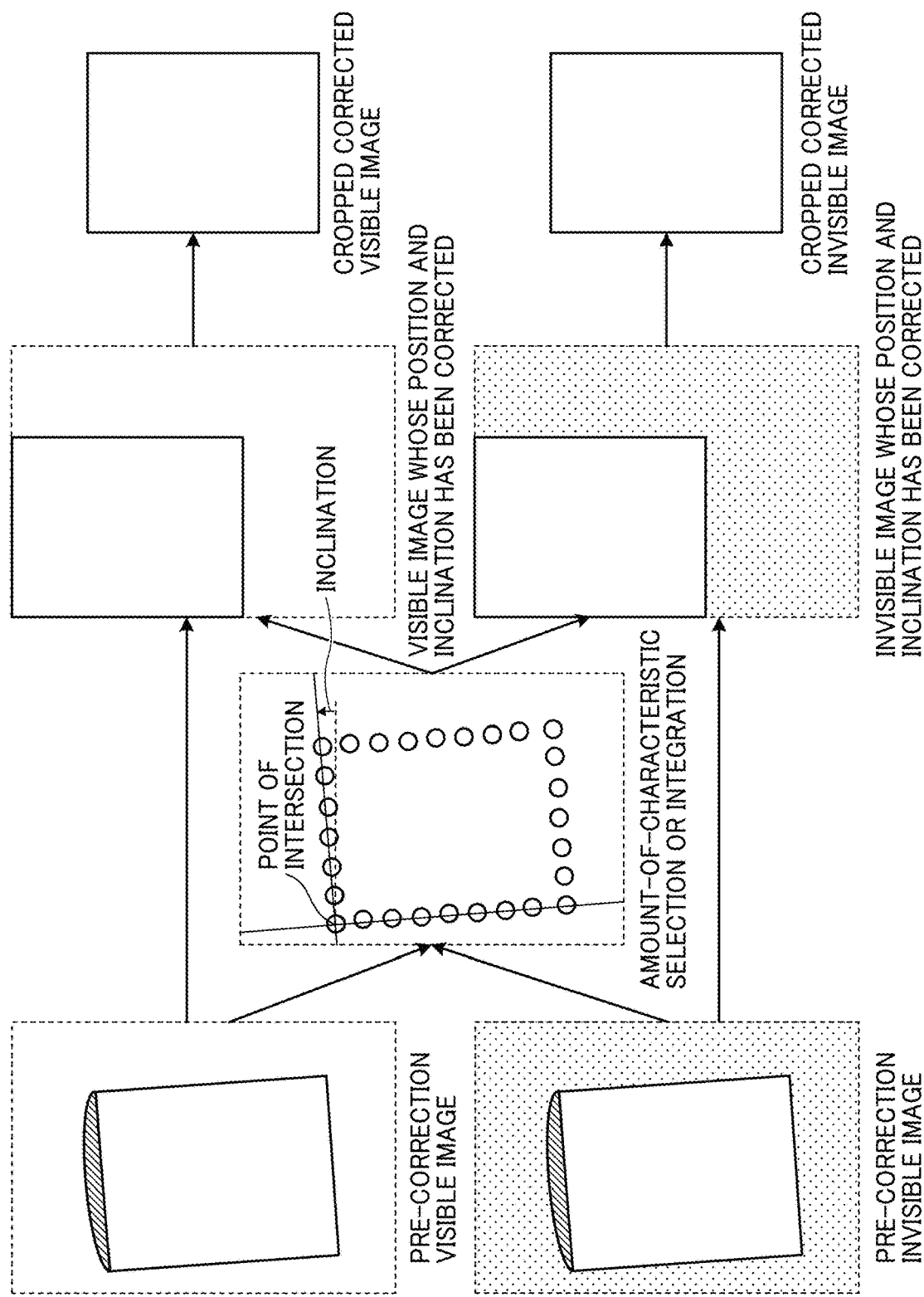
FIG. 35 is a diagram illustrating how the angle of inclination and position of an object is corrected and how the object is cropped, according to the third embodiment of the present disclosure.

FIG. 35 is a diagram illustrating how the angle of inclination and position of an object is corrected and how the object is cropped, according to the third embodiment of the present disclosure.

As illustrated in FIG. 35, the image correction unit 203 crops the area of the document 12, which serves as an object, in an absolutely precise manner, in combination with the above-described correction of the angle of inclination and the position. Even if the amount of characteristic cannot be detected precisely and the angle of inclination or the position cannot be corrected, the cropping can be done. Note that cropping under such conditions cannot be done in an absolutely precise manner.

Figure 36:
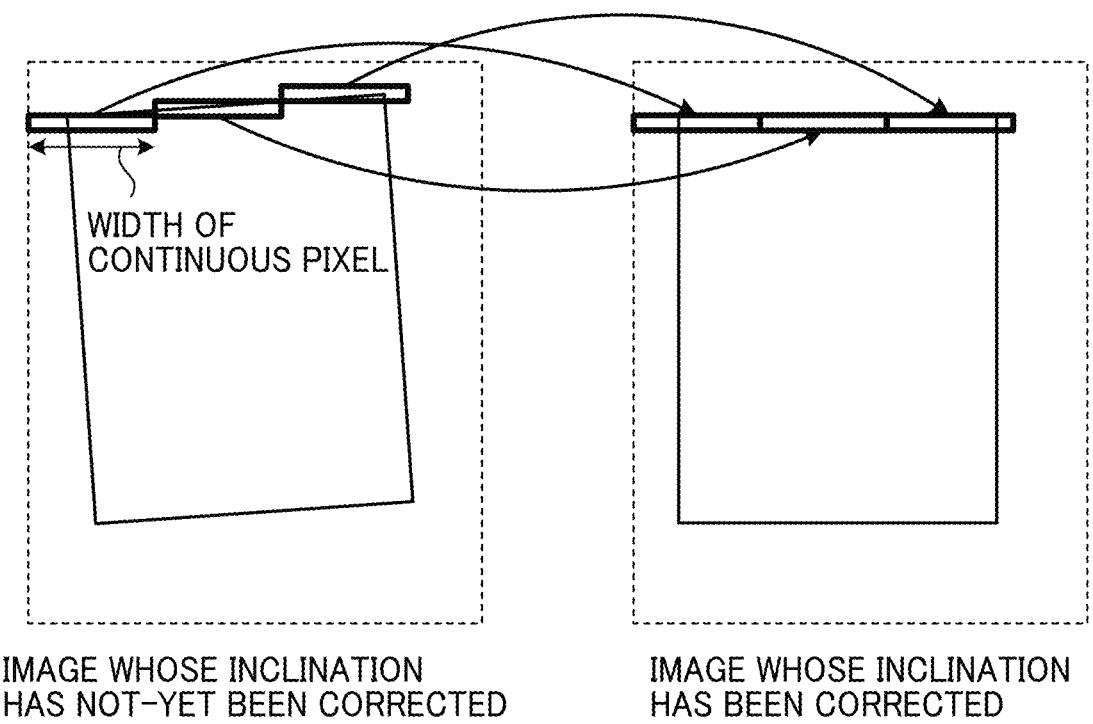
FIG. 36 is a diagram illustrating how an inclination is corrected, according to the third embodiment of the present disclosure.

FIG. 36 is a diagram illustrating how the inclination is corrected, according to the third embodiment of the present disclosure.

There are some cases in which the angle of inclination cannot be corrected. For example, when the image processing is performed by hardware, as illustrated in FIG. 36, the continuous pixels in an image need to be replaced collectively by a width equal to or wider than the minimum width for reasons of the processing speed. However, when the angle of inclination is too wide, correction or adjustment cannot easily be done. In such cases, although the angle of inclination cannot be corrected, there may be a demand that the area of the background device 13 should be deleted as much as possible.

For example, if the edge at the rightmost end is known, the right area is considered to be outside the area of the document 12, which serves as an object. For this reason, in such cases, the image correction unit 203 according to the present embodiment may trim the right area from the image.

Figure 37:
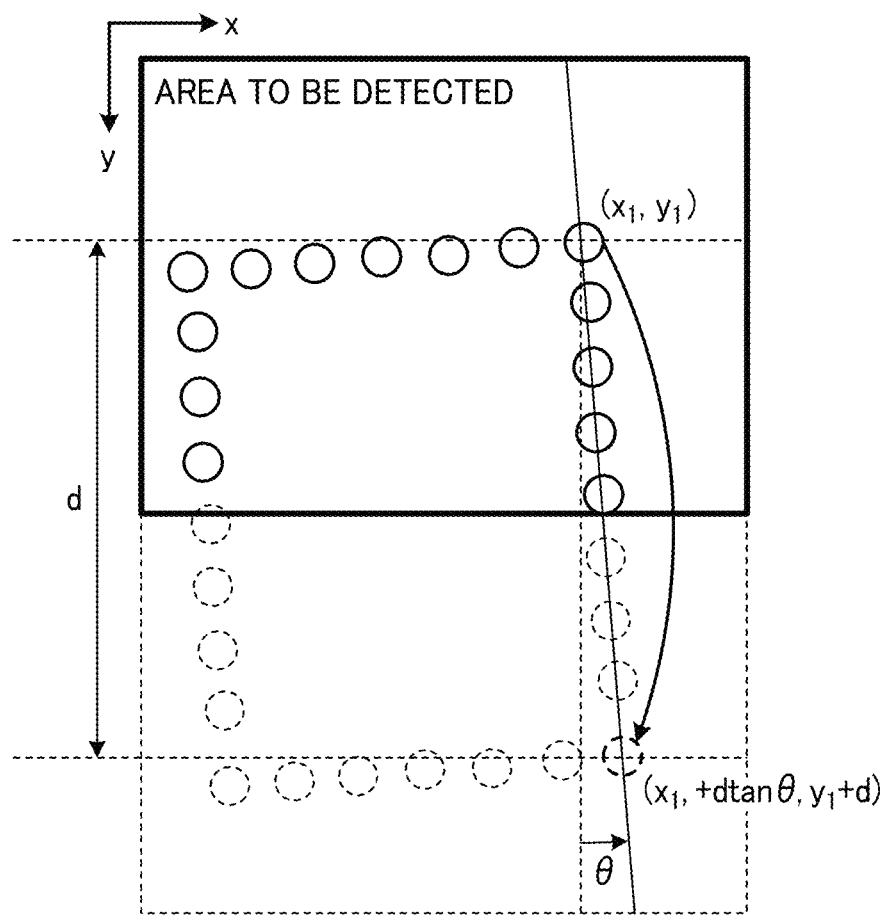
FIG. 37 is a diagram illustrating how a right edge is searched for, according to an embodiment of the third embodiment of the present disclosure.

FIG. 37 is a diagram illustrating how the right edge is searched for, according to the third embodiment of the present disclosure.

Even if an edge can be extracted only from a partial area of an image for reasons of the capacity of the memory, it is satisfactory as long as the size data in the vertical direction can be obtained by another means such as a sensor that detects the size of the document while the document is being conveyed. In such cases, as illustrated in FIG. 37, the image correction unit 203 predicts the right edge from the edge pixels in that region using the data of the angle of inclination of the edge pixels. The same applies to the top edge, the left edge, and the bottom edge of the document.

The image correction unit 203 crops a region of the document 12 that serves as an object. As a result, an unnecessary region of the background device 13 can be deleted. As a result, in the image forming apparatus 100 such as a multifunction peripheral (MFP), for example, the time and effort of inputting the size of the document 12, which serves as an object, can be reduced, and the outward appearance of an image can be enhanced. Moreover, the storage area in which the data of images is to be stored can be reduced, and the recording sheet P that is used when an image is to be photocopied can be downsized. Further, the amount of consumption of ink and toner can be reduced.

As described above, the size of the document 12, which serves as an object, is detected and cropped from the image based on the edges of the document. As a result, the time and effort of inputting the document size can be reduced. In particular, the time and effort of inputting the information about an irregular or indefinite size can be reduced. Moreover, the outward appearance of an image can be enhanced, and the storage area in which the data of images is to be stored can be reduced. Further, the recording sheet P that is used when an image is to be photocopied can be downsized, and the amount of consumption of ink and toner can be reduced.

As described above, according to the above embodiments of the present disclosure, the image correction unit 203 corrects at least one of the visible image or the invisible image. As a result, for example, the viewability of an image can be improved.

The image processing apparatus according to the above embodiments of the present disclosure is applied to a multifunction printer or multifunction peripheral (MFP) that has at least two of a photocopying function, a printing function, a scanning function, and a facsimile (FAX) function. However, no limitation is indicated thereby, and the image processing apparatus according to the above embodiments of the present disclosure may be applied to any desired image forming apparatus such as a copier, a printer, a scanner, and a facsimile (FAX).

Figure 38A:
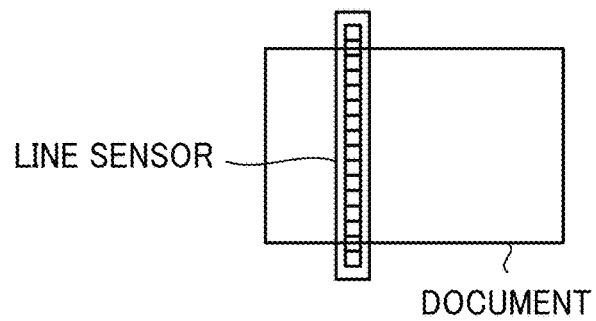
FIG. 38A, FIG. 38B, and FIG. 38C are diagrams each illustrating an image processing device according to a modification of the above embodiments of the present disclosure.
Figure 38B:
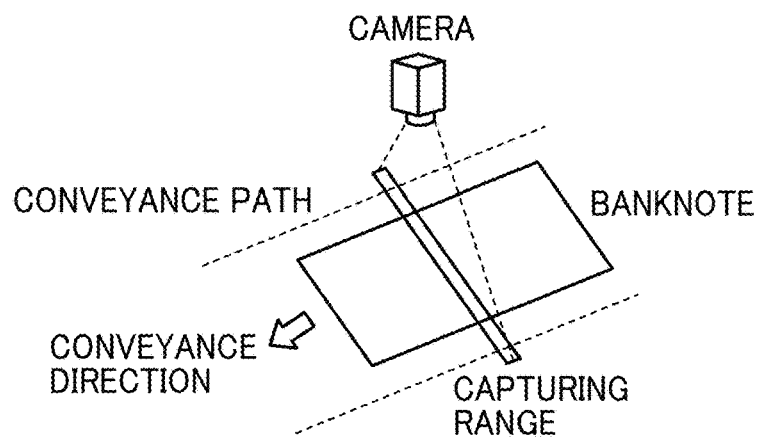
Figure 38C:
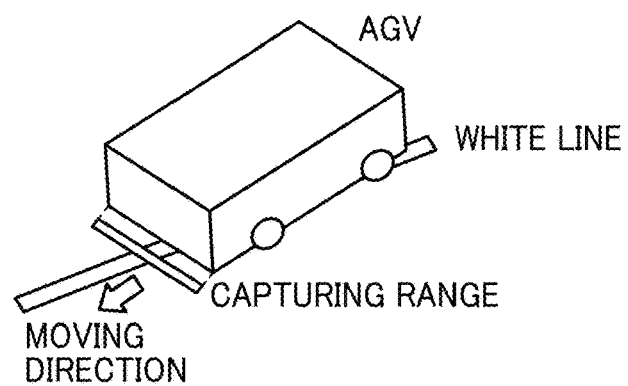

FIG. 38A, FIG. 38B, and FIG. 38C are diagrams each illustrating an image processing apparatus according to a modification of the above embodiments of the present disclosure.

In the above embodiments of the present disclosure, the image reading device 101 of the image forming apparatus 100 is applied to the image processing device. However, no limitation is indicated thereby. The image processing apparatus according to the above embodiments of the present disclosure does not need to scan an image but is satisfactory as long as it can acquire the level of reading such as a line sensor provided for the optical system of unity magnification as illustrated in FIG. 38A. Such an optical system of unity magnification may be, for example, a contact optical system using a contact image sensor (CIS). The image processing apparatus as illustrated in FIG. 38A moves a line sensor or a document to read the information of a plurality of lines.

Further, the image processing apparatus according to the present modification of the above embodiments of the present disclosure may be used for, for example, a banknote conveyance device as illustrated in FIG. 38B and a white line detector provided for an automated guided vehicle (AVG) as illustrated in FIG. 38C.

The object of the banknote conveyance device as illustrated in FIG. 38B is a banknote. For example, the amount of characteristic that is detected by the banknote conveyance device is used for correcting processes of the image. In other words, the banknote conveyance device as illustrated in FIG. 38B recognizes the angle of inclination of the banknote by edge detection, and performs the skew adjustment based on the recognized angle of inclination.

The object of the white line detector of the automated guided vehicle as illustrated in FIG. 38C is a white line. For example, the amount of characteristic that is detected by the white line detector of the automated guided vehicle is used to determine the moving direction of the automated guided vehicle. In other words, the white line detector of the automated guided vehicle performs edge detection to recognize the angle of inclination of the white-line area, and determines the moving direction of the automated guided vehicle based on the recognized angle of inclination. The white line detector provided for an automated guided vehicle may adjust the moving direction based on the location or direction of the automated guided vehicle in a later step of processing. For example, the automated guided vehicle according to the present modification of the above embodiments of the present disclosure may terminate the operation when a thickness different from a known thickness of the white line is detected.

In the above description, some preferred embodiments of the present disclosure and the modifications of those embodiments of the present disclosure are described. However, the description of the above embodiments and the modifications of those embodiments is given by way of example, and no limitation is intended thereby.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus comprising:
a first image processing device configured to process an invisible image of an object;
a second image processing device configured to process a visible image of the object; and
a controller configured to control the first image processing device and the second image processing device,
wherein the first image processing device includes a first skew detector configured to detect a skew of the object from the invisible image of the object,
wherein the second image processing device includes,
a second skew detector configured to detect the skew from the visible image of the object, and
circuitry configured to adjust the skew of the object based on a first result of skew detection performed by the first skew detector of the first image processing device or a second result of skew detection performed by the second skew detector of the second image processing device,
wherein the first image processing device includes:
an input interface configured to receive each one of the visible image and the invisible image output from a pair of scanners of the object; and
an output interface configured to output the visible image and the invisible image output from the input interface to a pair of image-data paths of the second image processing device, respectively,
wherein the output interface includes an output image selector configured to select one of the pair of image-data paths dedicated to each one of the visible image and the invisible image and output the each one of the visible image and the invisible image to the selected one of the pair of image-data paths.

2. The image processing apparatus according to claim 1, wherein the controller is configured to set a setting for detecting the skew, and
wherein the first image processing device is configured to detect the skew from the invisible image of the object, using the setting for detecting the skew.

3. The image processing apparatus according to claim 1, wherein the first image processing device comprises a memory configured to store a detection result of the skew,
wherein the controller is configured to obtain the detection result of the skew from the memory in response to a notification of the first result of skew detection from the first image processing device, and
wherein the circuitry of the second image processing device is configured to adjust the skew detected from the visible image of the object based on the detection result of the skew.

4. The image processing apparatus according to claim 1, wherein the output image selector is configured to select one of the image-data paths dedicated to each one of the visible image and the invisible image, based on setting of a register.

5. The image processing apparatus according to claim 1,
wherein the first image processing device comprises a register configured to set a parameter used to detect the skew, and
wherein the first image processing device is configured to turn on and turn off a skew detection function based on setting of the register.

6. The image processing apparatus according to claim 5, wherein the skew detection function of the register is turned off to skip the skew detection function of the first image processing device without removing the first image processing device.

7. The image processing apparatus according to claim 1, wherein the first image processing device is detachable.

8. The image processing apparatus according to claim 1,
wherein the visible image is an image of three plates including a red (R) plate, a green (G) plate, and a blue (B) plate, and
wherein the invisible image is an invisible image of one plate.

9. The image processing apparatus according to claim 1, wherein the circuitry is configured to:
write the visible image into a memory; and
read the visible image written into the memory, and
wherein, when the result of detection of the skew is obtained from the first image processing device, the circuitry is configured to read the visible image while adjusting the skew of the object based on the result of detection of the skew when the visible image written into the memory is to be read.

10. The image processing apparatus according to claim 9, wherein the circuitry is configured to read the visible image with rotary reading while adjusting the skew of the object.

11. The image processing apparatus according to claim 1, further comprising:
an image processing device including the first image processing device and the second image processing device,
wherein the image processing device is configured to perform an OR operation on an edge of the invisible image and an edge of the visible image to integrate a plurality of edges of the object.

12. The image processing apparatus according to claim 11,
wherein, when an edge of the invisible image is detected under normal operating conditions, the image processing device is configured to determine that the detected edge is an edge of the invisible image, and
wherein, when an edge of the invisible image is not detected under normal operating conditions, the image processing device is configured to determine that the detected edge is an edge of the visible image.

13. The image processing apparatus according to claim 11,
wherein, when both the edge of the visible image and the edge of the invisible image are not detected under normal operating conditions, the image processing device is configured to perform the OR operation on the edge of the invisible image and the edge of the visible image to integrate the plurality of edges of the object.

14. The image processing apparatus according to claim 11,
wherein the image processing device is configured to detect a size of the object based on the edges.

15. The image processing apparatus according to claim 11,
wherein the image processing device is configured to correct an inclination and a position of the object based on the edges, and
wherein the image processing device is configured to crop the object based on the edges.

16. The image processing apparatus according to claim 11,
wherein the image processing device is configured to correct at least one of the visible image or the invisible image.

17. A reading device comprising:
the image processing apparatus according to claim 1;
a background device configured to absorb invisible light; and
a reader configured to emit visible light and invisible light to read the visible image and the invisible image of the object including the background device.

18. An image processing apparatus comprising:
a first image processing device configured to process an invisible image of an object;
a second image processing device configured to process a visible image of the object; and
a controller configured to control the first image processing device and the second image processing device,
wherein the first image processing device includes a first skew detector configured to detect a skew of the object from the invisible image of the object,
wherein the second image processing device includes,
a second skew detector configured to detect the skew from the visible image of the object, and
circuitry configured to adjust the skew of the object based on a first result of skew detection performed by the first skew detector of the first image processing device or a second result of skew detection performed by the second skew detector of the second image processing device,
wherein the circuitry is configured to
write the visible image into a memory; and
read the visible image written into the memory, and
wherein, when the result of detection of the skew is obtained from the first image processing device, the circuitry is configured to read the visible image while adjusting the skew of the object based on the result of detection of the skew when the visible image written into the memory is to be read.

19. The image processing apparatus according to claim 18,
wherein the controller is configured to set a setting for detecting the skew, and
wherein the first image processing device is configured to detect the skew from the invisible image of the object, using the setting for detecting the skew.

20. The image processing apparatus according to claim 18,
wherein the first image processing device comprises a memory to store a detection result of the skew,
wherein the controller is configured to obtain the detection result of the skew from the memory in response to a notification of the first result of skew detection from the first image processing device, and
wherein the circuitry of the second image processing device is configured to adjust the skew detected from the visible image of the object based on the detection result of the skew.

* * * * *